United States Patent

Nishiura et al.

[11] Patent Number: 5,472,831
[45] Date of Patent: * Dec. 5, 1995

[54] SILVER HALIDE PHOTOGRAPHIC MATERIAL

[75] Inventors: Yosuke Nishiura; Yukio Shinagawa; Kiyokazu Hashimoto; Junichi Yamanouchi; Yasuo Mukunoki, all of Kanagawa, Japan

[73] Assignee: Fuji Photo Film Co., Ltd., Kanagawa, Japan

[*] Notice: The portion of the term of this patent subsequent to Jun. 1, 2010, has been disclaimed.

[21] Appl. No.: 316,490

[22] Filed: Oct. 3, 1994

Related U.S. Application Data

[63] Continuation of Ser. No. 822,927, Jan. 21, 1992, abandoned.

[30] Foreign Application Priority Data

Jan. 21, 1991 [JP] Japan ................................. 3-207114
Jan. 21, 1991 [JP] Japan ................................. 3-207115
Jan. 21, 1991 [JP] Japan ................................. 3-207116
Feb. 7, 1991 [JP] Japan ................................. 3-218117

[51] Int. Cl.$^6$ ........................... G03C 3/00; G03C 1/76
[52] U.S. Cl. .................... 430/501; 430/533; 430/523; 430/524; 430/525; 430/39; 430/930; 242/348.4; 354/275; 428/480; 428/694 B; 428/694 SL
[58] Field of Search .................... 430/533, 534, 430/501, 523, 524, 525, 39, 140, 930; 428/480, 694 B, 894 SL; 354/275; 242/348.4

[56] References Cited

U.S. PATENT DOCUMENTS

| 3,052,543 | 12/1958 | Bauer et al. | |
|---|---|---|---|
| 3,782,947 | 1/1974 | Krall | 430/31 |
| 4,183,749 | 1/1980 | Yabe et al. | 430/211 |
| 4,217,441 | 8/1990 | Bayless | 528/293 |
| 4,255,516 | 3/1981 | Katoh et al. | 430/533 |
| 4,279,945 | 7/1981 | Audran et al. | 430/524 |
| 4,451,606 | 5/1984 | Campbell | 524/445 |
| 4,780,402 | 10/1988 | Remmington | 430/523 |
| 4,883,706 | 11/1989 | Grosjean | 428/215 |
| 5,057,403 | 10/1991 | Kume et al. | 430/501 |
| 5,144,350 | 9/1992 | Takahashi et al. | 354/275 |
| 5,147,768 | 9/1992 | Sakakibara | 430/501 |
| 5,215,874 | 6/1993 | Sakakibara | 430/501 |
| 5,229,259 | 7/1993 | Yokota | 430/140 |
| 5,336,589 | 8/1994 | Mukunoki et al. | 430/501 |

FOREIGN PATENT DOCUMENTS

| 0172269 | 10/1984 | European Pat. Off. | |
|---|---|---|---|
| 0334367 | 3/1989 | European Pat. Off. | |
| 0355876 | 6/1989 | European Pat. Off. | |
| 2-205843 | 8/1990 | Japan | 430/501 |
| 2-214853 | 8/1990 | Japan | 430/501 |

Primary Examiner—Janis L. Dote
Attorney, Agent, or Firm—Sughrue, Mion, Zinn, Macpeak & Seas

[57] ABSTRACT

A silver halide light-sensitive material is described, including an embodiment containing a polyester film support having thereon at least one light-sensitive layer, wherein the polyester film support satisfies the following relationships:

$$Tg \leq 32.1A^2 + 55$$

$$X \geq -0.74Tg + 71.7$$

wherein Tg is a glass transition temperature (°C.); A is an equivalent water content (%) after moisture conditioning at 25° C. and 50% RH for 10 days; and X is a degree of crystallinity.

20 Claims, 7 Drawing Sheets

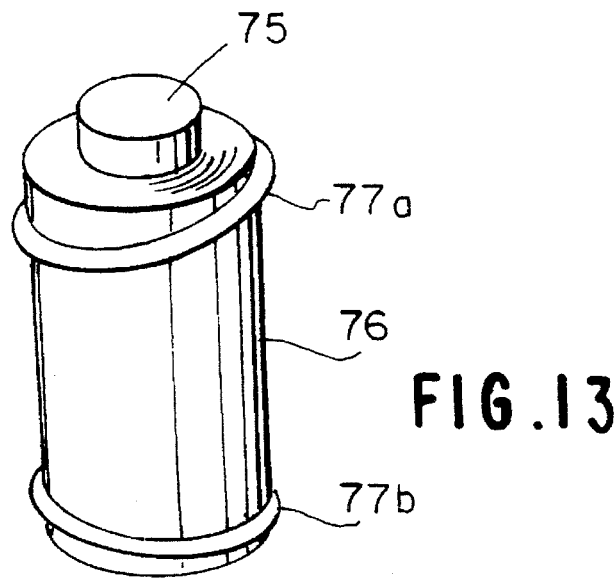
FIG.13
FIG.14
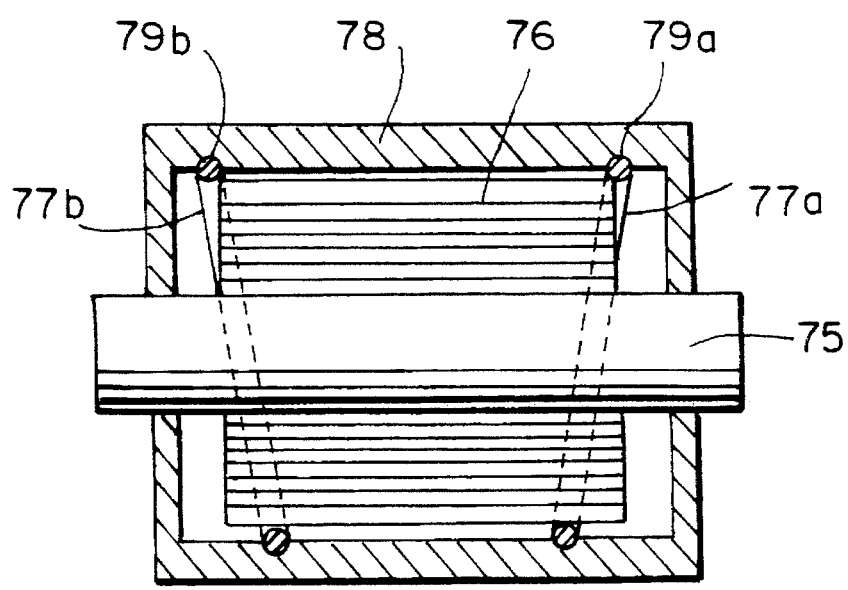

SILVER HALIDE PHOTOGRAPHIC MATERIAL

This is a Continuation of application Ser. No. 07/822,927 filed Jan. 21, 1992, now abandoned.

FIELD OF THE INVENTION

The present invention relates to a silver halide photographic material which is free from residual curling after development processing. More particularly, the present invention relates to a silver halide light-sensitive material which eliminates curling not only after development processing but also during storage in a cartridge while retaining excellent heat resistance and mechanical strength.

BACKGROUND OF THE INVENTION

Photographic materials are generally produced by coating at least one light-sensitive layer on a plastic film support. Commonly employed plastic films are cellulose plastics such as triacetyl cellulose (hereinafter abbreviated as TAC) and polyester plastics such as polyethylene terephthalate (hereinafter abbreviated as PET).

A PET film has recently been substituted for a TAC film because of its excellent productivity, mechanical strength and dimensional stability. In spite of these excellent properties of PET, the range of use of a PET film has been limited because it exhibits curling acquired during storage in the widely used roll form even after development processing, giving rise to handling problems.

In general, the forms of photographic materials are divided into sheets, such as X-ray films, plate making films, and cut films; and rolls, such as color or black-and-white negative films, 35 mm or less, packed in a cartridge to be loaded into ordinary cameras.

A TAC film chiefly used as a support for roll films are characterized primarily by outstanding superiority in freedom from optical anisotropy and transparency and also by its ability to eliminate curling during development processing. That is, since a TAC film exhibits relatively high water absorption for a plastic film due to its molecular structure, the molecular chain, once fixed by curling that has occurred with time during storage in a roll form, is re-arranged upon absorption of water during development processing whereby the curling can be eliminated. When a photographic material using a support that does not have this recovery property is used in a roll form, various problems arise such as scratching, smearing, and jamming in a printer after development.

On the other hand, to cope with the recent diverse use of photographic materials, marked advancements have been made in speeding up film feeding during photographing, increasing magnification, and reducing the size of cameras. Supports of photographic materials meeting these advanced techniques are required to have sufficient strength, sufficient dimensional stability, and reduced thickness.

In a conventional cartridge system for roll films, the film is wound around a spool not tightly but loosely, and the end of the roll film cannot be wound off the cartridge simply by turning the spool to the direction opposite to the winding direction. Therefore, the roll film has its end previously taken out of the cartridge to an appropriate length so that a photographer may fit the film end into a film feeding mechanism of a camera. However, the operation of fitting the film end into a feeding mechanism is not only troublesome but needs some skill, often resulting in a mistake, such as exposure of an intact film. Hence, there is an increased demand for a new type of camera system or cartridge system needing no such an operation. Establishment of such a system would lead to camera size reduction and ease in operation and make information recording feasible.

In these new systems, films comprising a thin support having a recording layer on the entire surface thereof or on the part of the surface thereof are utilized. Thus, films for use in these new systems must have higher mechanical properties than previciously used.

Recently developed systems include a cartridge system for easier camera loading, in which the spool of a cartridge, when loaded into a camera, is momentarily turned by a motor provided within the camera so that the film is automatically fed out. While the above-discussed curling has been a great problem confronting roll films in the conventional cartridge, the problem becomes acuter with the newer cartridge systems because the films must be tightly wound around the spool and therefore curl more readily undergo than in a conventional cartridge.

Under the present situation, however, a TAC film is brittle due to its rigid molecular structure and is not suitable for the above-described use. A PET film, though excellent in mechanical properties, cannot be used due to residual curling after development processing.

In order to endow PET with curling elimination properties, it has been proposed to copolymerize PET with an aromatic dicarboxylic acid having a metal sulfonate group and an aliphatic dicarboxylic acid having from 4 to 20 carbon atoms to produce water-absorbing PET as disclosed in JP-A-1-244446 (the term "JP-A" as used herein means an "unexamined published Japanese patent application"). The thus produced water-absorbing PET film exhibits improved curing elimination but, in turn, has a decreased heat distortion temperature, i.e., insufficient heat resistance.

SUMMARY OF THE INVENTION

An object of the present invention is to provide a silver halide photographic material comprising a support having high transparency and excellent mechanical properties, which easily eliminates curling during development processing while exhibiting high heat resistance.

Another object of the present invention is to provide a silver halide photographic material which is less liable to curling and easily eliminates curling during development processing while exhibiting high heat resistance and excellent transparency.

The above and other objects and advantages of the present invention are accomplished by the following four embodiments.

A first embodiment of the present invention provides a silver halide light-sensitive material comprising on a polyester film support at least one light-sensitive layer, wherein said polyester film support satisfies the following relationships:

$$Tg \leq 32.1A^2 + 55$$

$$X \geq -0.74Tg + 71.7$$

wherein Tg is glass transition temperature (°C.); A is equilibrium water content (%) after moisture conditioning at 25° C. and 50% RH for 10 days; and X is degree of crystallinity.

Polyester films satisfying the above relationships are preferably obtained by using a polyester having a hydrophilic group or a polyester containing a water-absorbing substance and controlling the degree of crystallinity by stretching or heat setting.

A second embodiment of the present invention provides a silver halide photographic material comprising on a polyester film support at least one photographic layer, wherein said polyester film support satisfies the following relationships:

$Tg \leq 32.1A^2 + 55$ $X \geq -0.74Tg + 71.7$ $S \geq 13$ $T \leq 0.25$ $K \geq 80$ wherein Tg, A, and X are as defined above; S is stiffness (g) at a thickness of 70 μm; T is average percent thermal resistance (%) in transverse direction (TD) and machine direction (MD); and K is percent transmission (%) at a wavelength of 400 nm. The machine direction is longitudinal direction of the support and corresponds to feeding direction on processing a photographic material in an auto processor. The transverse direction is the width direction of the support and is one perpendicular to the machine direction.

Polyester films satisfying the above relationships are preferably obtained by using a polyester having a hydrophilic group or a polyester containing a water-absorbing substance and controlling the degree of crystallinity, stiffness, thermal resistance, and absorbance by stretching or heat setting.

A third embodiment of the present invention provides a silver halide photographic material comprising on a polyester film support at least one light-sensitive layer, wherein said polyester film support comprises a mixture of (i) polyethylene terephthalate as a main component and (ii) at least one of a polyester having a hydrophilic group and a water-absorbing substance.

In the third embodiment, the use of a polyester having a hydrophilic group or a water-absorbing substance makes the support capable of absorbing water during development processing to eliminate curling, while the use of PET having heat resistance brings about improved heat resistance.

A fourth embodiment of the present invention provides a silver halide photographic material comprising on a polyester film support at least one light-sensitive layer, wherein said polyester film support is a laminate film composed of at least one layer comprising a polyester having a Tg of not lower than 63° C. and at least one layer comprising at least one of a polyester having a hydrophilic group and a water-absorbing polymer.

BRIEF DESCRIPTION OF THE DRAWINGS

FIG. 13 shows a spool and a photographic film in the cartridge.

FIG. 14 shows an inside of the cartridge.

DETAILED DESCRIPTION OF THE INVENTION

Figure 1:
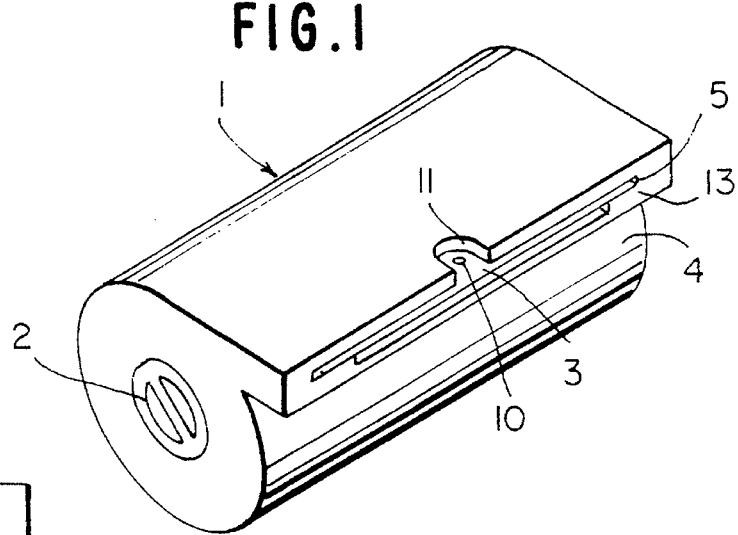
FIG. 1 shows a slant view of a cartrige for a photographic film.

Since the polyester having a hydrophilic group which can be used in the present invention resembles PET in structure, it is more easily blended with PET to provide a highly transparent resin composition as compared with other hydrophilic polymers. Further, when it is laminated with a heat resistant polyester layer according to the fourth embodiment, it exhibits good adhesion to provide a satisfactorily transparent film.

The terminology "polyester" as used herein means a polyester mainly comprising a dibasic acid component and a glycol component, and the terminology "polyester having a hydrophilic group" as used herein means any polyester having a higher water content than PET, a well-known polyester. The polyester having a hydrophilic group will hereinafter be referred to as a hydrophilic polyester.

The hydrophilic group in the hydrophilic polyester may be introduced into either of a dibasic acid component or a glycol component. Examples of hydrophilic groups which can be introduced include monovalent or divalent substituents, e.g., a sulfo group, a sulfino group, a phosphono group, a carboxyl group, and a salt of these acid radicals; a polyalkyleneoxy group, an alkoxy group, an alkoxycarbonyl group, a sulfamoyl group, a carbamoyl group, an acylamino group, a sulfonamido group, a disulfonamido group, a ureido group, a urethane group, an alkylsulfonyl group, and an alkoxysulfonyl group. Preferred of them are a sulfo group, a sulfino group, a phosphono group, a carboxyl group, a salt of these acid radicals, a polyalkyleneoxy group, and a disulfonamido group.

Dibasic acids containing such a hydrophilic group include 5-sodium sulfoisophthalic acid, 2-sodium sulfoterephthalic acid, 4-sodium sulfophthalic acid, 4-sodium sulfo-2,6-naphthalenedicarboxylic acid, 1,3,5-benzenetricarboxylic acid monosodiumsalt, and compounds having the following formulae:

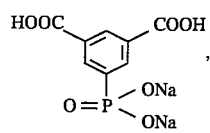

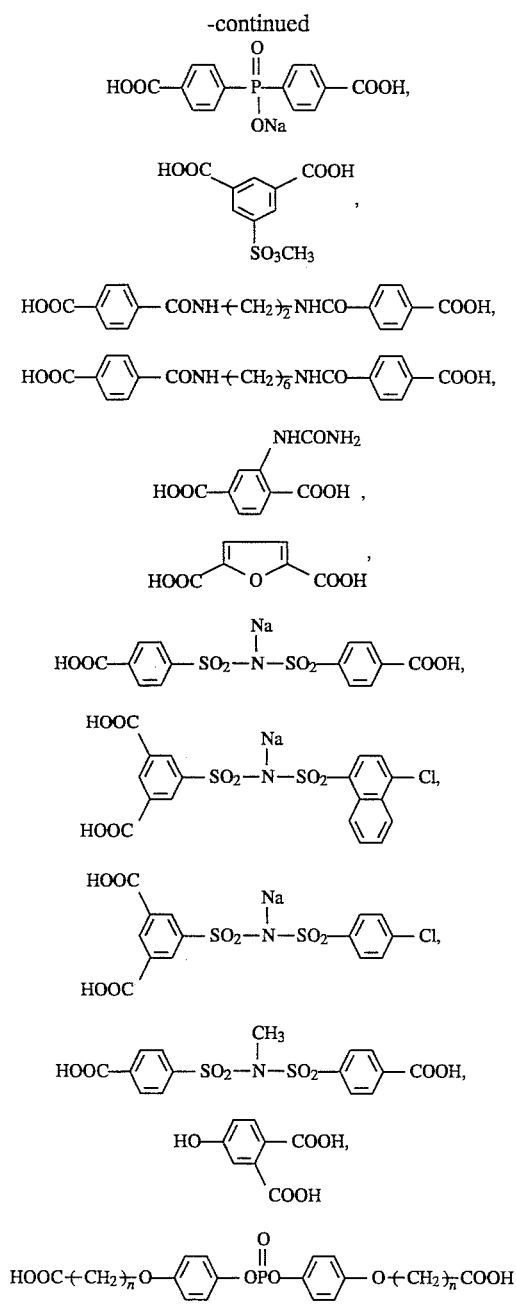

(n represents an integer of 1 or more.)

Of these dibasic acids, those having a sodium salt may be those in which the sodium atom is displaced by a hydrogen atom or other metal atoms, e.g., lithium and potassium. If desired, these dibasic acids may be used in the form of an ester (alkyl or aryl ester) or an acid chloride at the carboxyl group thereof for production convenience.

Glycol components having the above-mentioned hydrophilic group preferably include HO—(CH$_2$)$_2$—(OCH$_2$CH$_2$)$_n$—O(CH$_2$)$_2$—OH (wherein n is an integer of from 1 to about 20), HO—(CH(CH$_3$)CH$_2$O)$_n$—H (wherein n is an integer of from 2 to about 20), and a compound having formula:

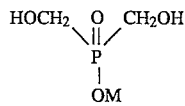

wherein M represents a hydrogen atom or an alkali metal atom, e.g., Li, Na, and K.

In addition, diol components, e.g., hydroxy polyesters, hydroxy polyacetals, and hydroxyester amides, may also be employed. The hydroxy polyesters are reaction products between a polyhydric (chiefly dihydric) alcohol and a dibasic carboxylic acid. The hydroxyacetals are obtained from a glycol (e.g., diethylene glycol) and formaldehyde. The hydroxyester amides are condensates obtained from, for example, a dibasic carboxylic acid and an aminoalcohol alone or a mixture of an aminoalcohol and a diamine or a polyamine.

Examples of useful dibasic acids include terephthalic acid, isophthalic acid, phthalic acid, phthalic anhydride, succinic acid, glutaric acid, adipic acid, sebacic acid, succinic anhydride, maleic acid, fumaric acid, maleic anhydride, itaconic acid, citraconic anhydride, tetrahydrophthalic anhydride, diphenylene-p,p'-dicarboxylic acid, tetrachlorophthalic anhydride, 3,6-endomethylenetetrahydrophthalic anhydride, 1,4-cyclohexanedicarboxylic acid, and compounds having the following formulae:

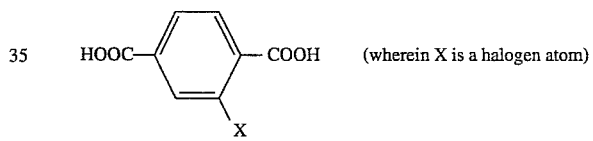 (wherein X is a halogen atom)

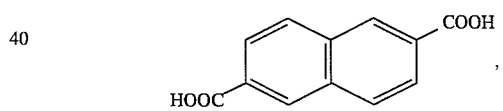

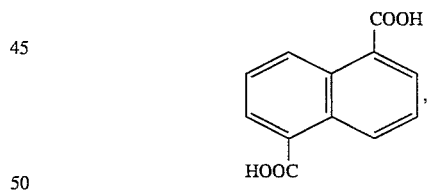

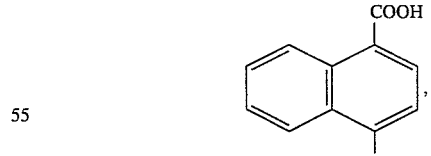

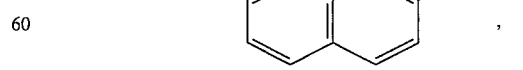

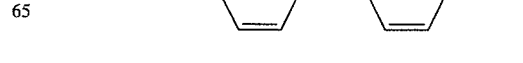

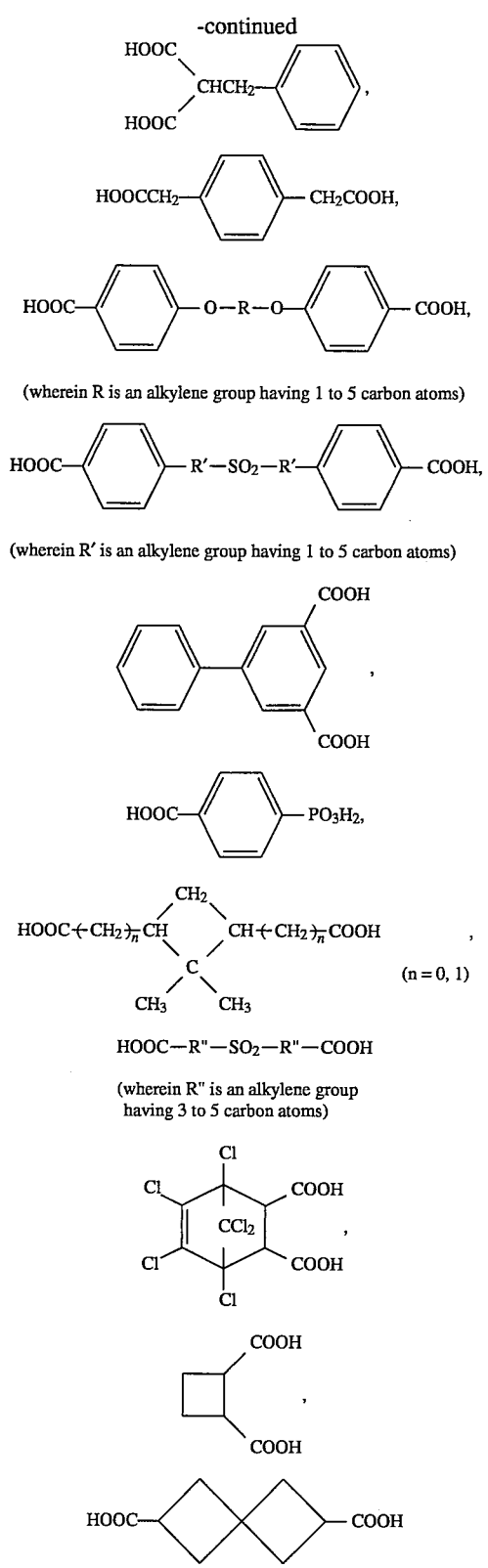
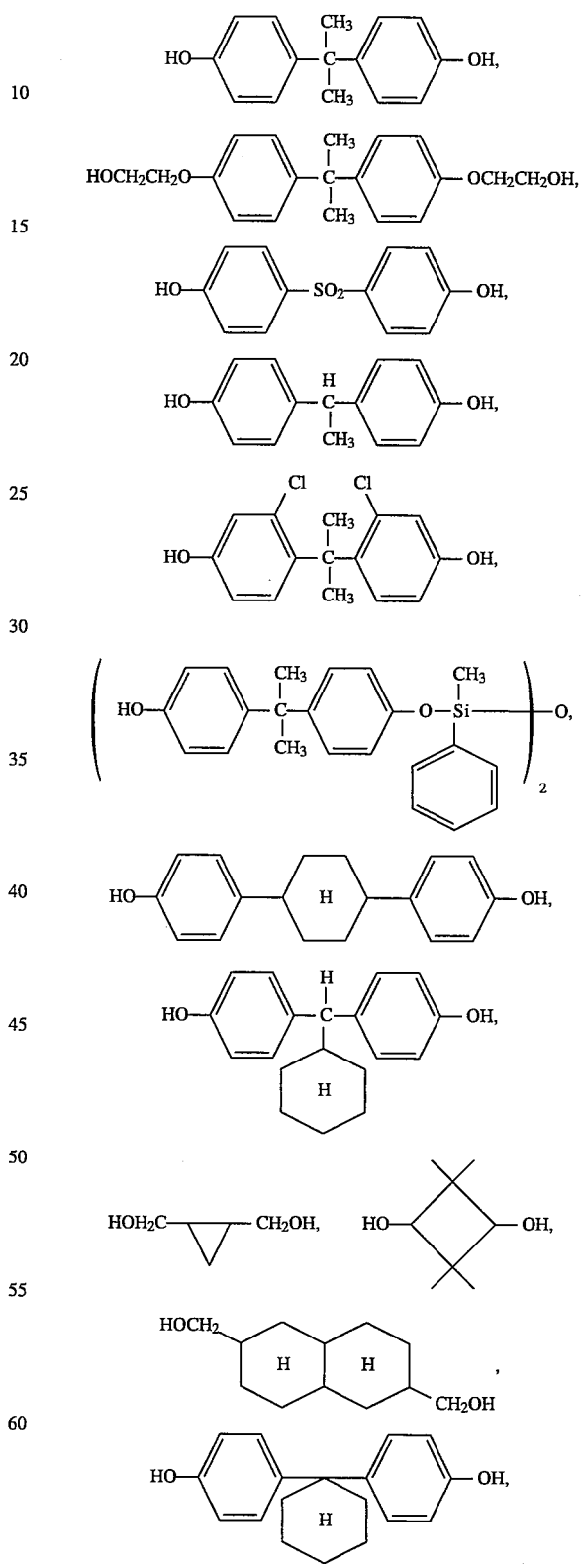
1,4-cyclohexanedimethanol, 1,3-cyclohexanediol, 1,1-cyclohexanedimethanol, catechol, resorcin, hydroquinone, 1,4-benzenedimethanol, and compounds having the following formulae:
Examples of useful diols include ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 1,12-dodecanediol, 1,4-cyclohexanediol, -continued

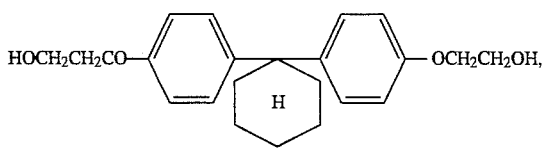

If desired, the polyester may further comprise a monofunctional or three- or higher-functional hydroxyl-containing compound or an acid radical-containing compound.

Further, the polyester may comprise a compound having a hydroxyl group and a carboxyl group (or an ester thereof) per molecule. Such a compound includes compounds having the following formulae:

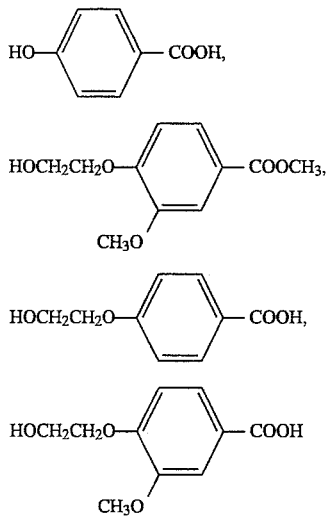

The polyester having a hydrophilic group in the present invention preferably comprises a compound represented by formula (I), a compound represented by formula (II), and at least one of a compound represented by formula (III) and a compound represented by formula (IV):

HO—$R^1$—OH          (I)

wherein $R^1$ represents a straight-chain or branched-chain alkyl group or alkylene having 2 to 30 carbon atoms, or an allyl group;

HOOC—$Ar^1$—COOH          (II)

wherein $Ar^1$ represents a substituted or unsubstituted benzene ring or naphthalene ring;

HO—$R^2$—OH          (III)

wherein $R^2$ represents a substituted or unsubstituted (poly-)oxyalkylene or (poly)oxyglycerin;

wherein $Ar^2$ represents a benzene ring or a naphthalene ring and $X^1$ represents a carboxyl group, a sulfo group, a sulfino group, a phosphoric acid group, a hydroxyl group or salts thereof.

The polyester to be used in the present invention is preferably a copolymer polyester (copolyester) mainly comprising ethylene glycol and terephthalic acid. The proportion of the above-mentioned hydrophilic component in the copolyester (the above-mentioned hydrophilic group in the hydrophilic polyester), though subject to variation depending on the hydrophilic properties of the component itself and the desired physical properties (e.g., refractive index and mechanical strength) of the resulting polyester, preferably ranges from 1 to 50% by weight, and more preferably from 2 to 40% by weight, based on the total amount of the polyester.

Copolymerizable components other than ethylene glycol, terephthalic acid, and the hydrophilic component can be used in a proportion arbitrarily selected taking into consideration the physical and mechanical properties of the resulting polyester, such as hydrophilic properties, refractive index, transparency, glass transition temperature, melting point, and folding endurance. A preferred proportion of these arbitrary components in the copolyester is up to 50% by weight, and particularly up to 40% by weight, based on the total amount of the polyester.

The polyester to be used in the present invention can be prepared according to known processes. For example, an acid component and a glycol component are directly esterified. Where an acid component is used as a dialkyl ester, it is subjected to interesterification with a glycol component. Alternatively, an acid component may be converted to its acid halide and then reacted with a glycol component. In these cases, the reaction may be carried out, if desired, in the presence of a catalyst for interesterification or polymerization or a heat stabilizer.

For details of the polyester components and processes for synthesizing the polyester, refer, e.g., to *KOBUNSHI JIKKENGAKU (Polymer Experiments)*, Vol. 5 "JUSH-UKUGO TO JUFUKA" (Polycondensation and Polyaddition), pp. 103–136, Kyoritsu Shuppan (1980) and *GOSEI KOBUNSHI V (Synthesis Polymer V)*, pp. 187–286, Asakura Shoten (1971).

The polyester, which is used in the present invention, preferably has an average molecular weight of from about 3,000 to about 100,000.

Specific examples of polyesters which are preferably used in the present invention are shown below for illustrative purposes only and not for limitation. The figures in parentheses indicate the copolymerization molar ratio of each component.

P-1: TPA/AA/SSIA/EG (88/5.3/6.7/100)
P-2: TPA/AA/SSIA/EG (90/7.2/2.8/100)
P-3: TPA/AA/SSIA/EG (88/7.2/4.8/100)
P-4: TPA/SSIA/EG/DEG (95/5/85/15)
P-5: TPA/SSIA/EG/TEG (93/7/80/20)
P-6: TPA/AA/SPIA/EG (90/4/6/100)
P-7: TPA/PEG(4000)/EG (100/0.5/99.5)
P-8: TPA/IPA/SSIA/PEG(4000)/EG (95/4/1/0.3/99.7)
P-9: TPA/SSIA/SA/TEEG/EG (95/3/2/5/95)
P-10: TPA/SCPP/AA/EG (90/5/5/100)
P-11: TPA/AA/SSIA/EG/DEG (88/5/7/90/10)
P-12: TPA/PISB/AA/EG (94/3/3/100)
P-13: TPA/PISB/EG/DEG (97/3/95/5)
P-14: TPA/EG/DMPS (100/95/5)
P-15: TPA/SSIA/SA/EG/BHPP (90/2/8/95/5)

Abbreviations used above have the following meanings.

TPA 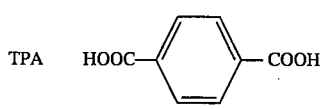

AA 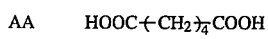

SSIA 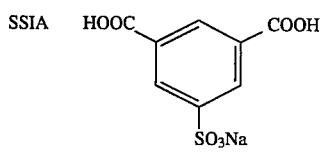

EG  HOCH$_2$CH$_2$OH

DEG  HO―(CH$_2$CH$_2$O)$_{\overline{2}}$H

TEG  HO―(CH$_2$CH$_2$O)$_{\overline{3}}$H

SPIA 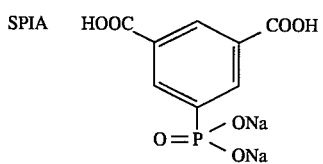

PEG(4000):  HO―(CH$_2$CH$_2$O)$_{\overline{n}}$H  (mol. wt.: 4000)

IPA 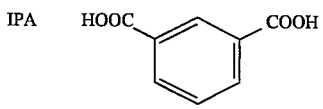

SA  HOOC―(CH$_2$)$_{\overline{8}}$COOH

TEEG  HO―(CH$_2$CH$_2$O)$_{\overline{4}}$H

SCPP 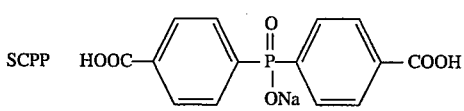

PISB 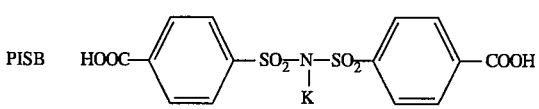

DMPS 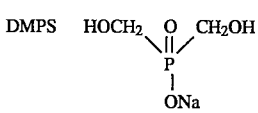

BHPP 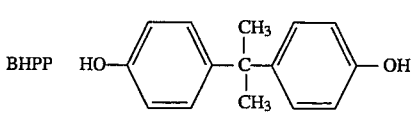

The copolymerization ratio given for each dibasic acid component is a charged molar ratio. The copolymerization ratio given for each glycol component except EG is a charged mole percentage based on the total acid components. While EG is charged in excess over an acid component according to a general ester exchange method, the molar ratio of EG shown above is calculated so that the total dibasic acid components and the total glycol components in the final product each should be 100.

The water-absorbing substance which can be used in the present invention includes water-absorbing polymers having at least one functional group selected from a sulfo group, a sulfino group, a phosphono group, a carboxyl group, a salt of these acid radicals, a polyalkyleneoxy group, an alkoxy group, an alkoxycarbonyl group, a sulfamoyl group, a carbamoyl group, an acylamino group, a sulfonamido group, a disulfonamido group, a ureido group, a urethane group, an alkylsulfonyl group, and an alkoxysulfonyl group; and water-absorbing inorganic substances containing at least one compound selected from an oxide, sulfide, sulfate, sulfite, carbonate, hydroxide, halide or nitrate of alkali metals, alkaline earth metals, Si, Al, Zr, Mo, Fe, Sb or Pb. The water-absorbing polymer and the water-absorbing inorganic substance may be used in combination.

Examples of the water-absorbing polymer include polyacrylic acid and derivatives thereof, polymethacrylic acid and derivatives thereof, polyacrylamide and derivatives thereof, polyethylene glycol and derivatives thereof, polystyrenesulfonates and derivatives thereof, and polyethylene oxide and derivatives thereof. Various kinds of these polymers are used as commercial products.

The water-absorbing polymer of the present invention preferably comprises a compound represented by formula (V) or (VI):

 (V)

 (VI)

wherein $R^3$ represents a hydrogen atom, a methyl group, and a halogen atom (e.g., Cl, Br and I), $X^2$ represents ―COOM, ―SO$_3$M, ―OPO$_3$M, ―OSO$_3$M, ―(CH$_2$CH$_2$O)$_m$―H, ―Ph―SO$_3$M and ―CONH$_2$, wherein M represents a hydrogen atom, an alkali metal (e.g., Na, K and Li) or an alkaline earth metal (e.g., Ca and Mg); Ph represents a phenyl group; m represents an integer of 1 to 100; n represents an integer of 50 to 5,000; and $n_2$ represents an integer of 5 to 5,000.

The water-absorbing substance is preferably used as a mixture with the above-mentioned hydrophilic polyester to further improve transparency.

A blend of the hydrophilic polyester or water-absorbing substance and PET can be molded into film by extrusion or a like film formation technique. PET is preferably used in an amount of from 20 to 95% by weight, and more preferably from 30 to 80% by weight, based on the blend. If the PET ratio exceeds 95%, the support has insufficient water absorption properties, and if it is less than 20%, the support has reduced heat resistance. In this polymer blend, PET and other polymers may be compatible with each other, or as far as transparency of the blend is assured, they may be in separate phases. If desired, various compatibilizers may be added to the blend. The water-absorbing polymer is used in a proportion of from 5 to 80% by weight, and preferably from 7 to 50% by weight, based on the blend.

Typical examples of the water-absorbing inorganic compounds include silica, alumina, calcium carbonate, magnesium carbonate, kaolin, clay, talc, and titanium oxide. Commercial products of these compounds can be used. These inorganic compounds may be added to PET either as such or as surface-treated with, for example, a long-chain fatty acid or a silane coupling agent, so as to have improved affinity to PET. The water-absorbing inorganic compound is added in an amount preferably of from 0.1 to 30% by weight, and more preferably of from 0.2 to 20% by weight, based on PET. Smaller amounts produce no effect, and greater amounts cause haze. The water-absorbing inorganic compound may be added either during or after polymerization. Alternatively, an inorganic compound precursor may be added to the polymerization system and converted to the inorganic compound in situ during the polymerization reaction.

Addition of these water-absorbing inorganic compounds not only enhances water absorption properties of the support to accelerate elimination of curling but also improves heat resistance.

The polyester film according to the present invention may further comprise various additives. For example, it is known to add dyes for the purpose of avoiding a so-called light piping phenomenon often observed with a polyester film support. In particular, a polyester film, when used as a support of photographic materials, causes light piping due to its high refractive index. One of great differences in optical properties between a TAC film and a polyester (e.g., PET) film is that the latter has a higher refractive index. That is, the refractive index of TAC is 1.5 whereas that of PET is about 1.6. On the other hand, gelatin which is exclusively used in a subbing layer and photographic emulsion layers has a refractive index between 1.50 and 1.55. Accordingly, a refractive index ratio of gelatin to PET is 1.5/1.6, i.e., less than 1. As a result, when light enters from a film edge, it is apt to be reflected on the interface between the support and the emulsion layer, causing light piping.

Dyes which can be used for film dyeing are, while not being limited, preferably gray dyeing. Further, the dyes to be used preferably have excellent heat resistance in a temperature range for film formation and excellent compatibility with polyesters. An appropriate mixture of commercially available dyes for polyesters, e.g., "Diaresin" produced by Mitsubishi Kasei Corporation and "Kayaset" produced by Nippon Kayaku Co., Ltd., can be employed for this purpose.

The color density of dyeing should be at least 0.01, and preferably 0.03 or higher, as measured in the visible region with a Macbeth densitometer.

Non-extended sheets can be prepared by first mixing the above-described film-forming materials, i.e., a hydrophilic polyester, PET containing a water-absorbing substance, and additives such as dyes, and then melt-extruding the mixture. The non-extended sheets are biaxially stretched and are subject to heat-treatment to provide a film.

Stretching in transverse and machine directions can be carried out either successively or simultaneously. A stretch ratio, while not being limited, suitably ranges from 2.0 to 5.0. Biaxial stretching may be followed by re-stretching in a transverse or machine direction.

A vacuum drying method and dehumidification drying method are preferable as drying methods before melt-extruding.

Stretching temperature is selected from the Tg up to the melting point of the polymer used. For example, in the case of PET, stretching temperature is preferably from 70° to 100° C. in the machine direction and from 80° to 160° C. in the transverse direction.

The heat setting temperature is preferably from 150° to 210° C., more preferably from 160° to 200° C.

The thickness of the polyester film having a laminate structure is appropriately selected depending on the end use, and is preferably from 25 to 250 μm, and more preferably from 40 to 150 μm.

The polyester film according to the forth embodiment of the present invention is comparable or even superior to a conventionally employed PET film in transparency and mechanical strength, i.e., having a haze of not more than 3%, a breaking strength of from 8 to 25 kg/mm$^2$, an initial modulus of elasticity of from 200 to 500 kg/mm$^2$, and a tear strength of not less than 30 g at a film thickness of 50 μm.

In the fourth embodiment, it is preferable that at least one layer of the hydrophilic polyester (i.e., the polyester having a hydrophilic group of the present invention) or a water-absorbing polymer is present within a depth of 20 μm from at least one surface side of the laminate film.

The mechanism of curling elimination is that the support absorbs water during development processing and the absorbed water plasticizes molecules of the polymer, whereby curling is eliminated. Therefore, when a layer of the hydrophilic polyester or a water-absorbing polymer is present at a position of a depth of 20 μm or more from surface side of the support, the support can not obtain enough absorbed water to eliminate curling during development processing.

The hydrophilic polyester or the water-absorbing polymer is preferably laminated on both sides of the layer having a Tg of not lower than 63° C. That is, the polyester having a Tg of 63° C. or higher contributing to heat resistance is sandwiched in between a pair of hydrophilic polyester or water-absorbing polymer layers. Because the greatest distortion from curling occurs in the vicinity of both surfaces of the support, the distortion can effectively be removed by providing the hydrophilic polyester layer or water-absorbing polymer layer in these areas.

The polyesters having a Tg of not lower than 63° C., which has heat-resistance, are described below. A photographic material is dried in warm air in the final stage of development processing. If a support has a Tg lower than the drying temperature usually ranging from 50° to 60° C., the film after development processing is liable to undergo thermal deformation. Therefore, a unit composite film must have a Tg higher than the drying temperature. In order to examine the relationship between Tg and thermal deformation, single-layered films were experimentally prepared from various polyesters having different Tg, and a Tg above which a film undergoes deformation was measured. The results obtained are shown in the Table below.

TABLE

| Tg (°C.) | Component (by mole) | | | Deformation After Development |
|---|---|---|---|---|
| | Terephthalic Acid | Adipic Acid | Ethylene Glycol | |
| 61 | 100 | 12.8 | 112.8 | not observed |
| 62 | 100 | 11.8 | 111.8 | not observed |
| 63 | 100 | 11.0 | 111.0 | not observed |
| 64 | 100 | 10.2 | 110.2 | slightly observed |
| 65 | 100 | 9.5 | 109.5 | markedly observed |

It is seen that a support must have a Tg of 63° C. or higher so as not to undergo thermal deformation after development processing.

In the above experiments and throughout the present specification, Tg was measured as follows.

Tg Measuring Method:

10 mg of a sample is set in a scanning calorimeter. The temperature is raised at a rate of 20° C./min in a nitrogen stream, and an arithmetic mean value of the temperature at which the thermogram begins to incline and the temperature at which the thermogram returns to the base line. Some samples show no inclination but an endothermic peak. In these cases, the peak temperature is taken as Tg.

Typical but non-limiting examples of polyesters having a Tg higher than 63° C. are shown below.

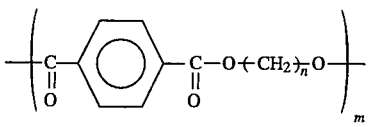

(wherein n is 1 or 2)

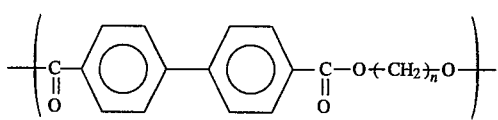

(wherein n is 1 to 4)

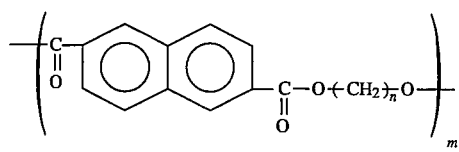

(wherein n is 1 or 2)

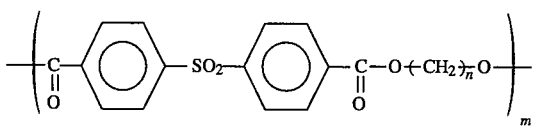

(wherein n is an integer of 1 to 6)

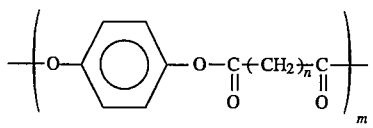

(wherein n is 1 or 2)

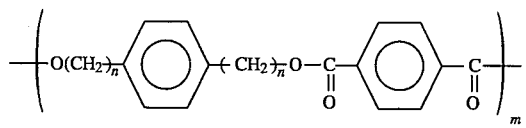

(wherein n is 1 or 2)

The polyester having a Tg of 63° C. or higher can be prepared in the same manner as described above.

The polyester having a Tg of 63° C. or higher preferably has an average molecular weight of from about 3,000 to about 100,000.

The polyester having a Tg of 63° C. or higher preferably includes PET, polyethylene naphthalate, and derivatives thereof from the standpoint of cost and ease of supply.

The polyester support according to the forth embodiment may further contain various additives, such as dyes for the same purpose as described above with respect to light piping.

The support having a laminate structure according to the forth embodiment can be produced by drying each of the polyester having a Tg of not lower than 63° C., the hydrophilic polyester or water-absorbing polymer, and additives such as dyes and molding them by co-extrusion or film casting.

In co-extrusion, each of the hydrophilic polyesters or water-absorbing polymers and the polyester having a Tg of not lower than 63° C. is melted at a temperature at least 10° C. higher than the melting point of the respective polymer. Additives such as dyes, if used, are preferably dispersed uniformly by means of a twin-screw or single-screw kneading machine. The laminate sheet extruded from a co-extrusion die is delivered to a cooling zone, e.g., a cooling drum or a cooling bath, where it is cooled and solidified. In the case of using a cooling drum, the drum surface is preferably coated with a thin coating (e.g., water and a surface active agent-containing liquid) by means of a roll coater so that the sheet closely contacts the drum surface. The sheet may also be brought into direct contact with the cooling drum. An air knife may be made use of for bringing the sheet into close contact with a quenching surface of, e.g., a cooling drum.

For the production of a laminate film composed of three or more layers, the number of co-extrusion die lips may be increased as necessary, or co-extrusion may be repeated until a required number of layers are laminated.

The thus prepared laminate sheet is then subjected to biaxial stretching to obtain a support. Stretching in the transverse and machine directions can be carried out either successively or simultaneously. A stretch ratio, while not being limited, suitably ranges from 2.0 to 5.0. Biaxial stretching may be followed by re-stretching in a transverse or machine direction.

The stretching temperature is selected from the Tg up to the melting point of the polymer used. For example, in the case of PET, stretching temperature is preferably from 70° to 100° C. in the machine direction and from 80° to 160° C. in the transverse direction.

In addition to the co-extrusion methods stated above, the support having a laminate structure can also be obtained by film casting. Film casting can be carried out by (i) a method comprising forming an unstretched film from one of the polymers, applying a prescribed amount of the other polymer by using an appropriate solvent, and successively or simultaneously stretching the laminate biaxially, (ii) a method comprising forming an unstretched film from one of the polymers, stretching the film in one direction, and applying a prescribed amount of the other polymer by coating using an appropriate solvent or hot-melt extrusion, or (iii) a method comprising forming an unstretched film from one of the polymers, stretching the film biaxially, and applying a prescribed amount of the other polymer by coating using an appropriate solvent or hot-melt extrusion. The stretching in these methods is performed under the same conditions as described above with reference to the co-extrusion method.

The thickness of the polyester film having a laminate structure is appropriately selected depending on the end use, preferably from 25 to 250 μm, and more preferably from 40 to 150 μm. The thickness of each layer comprising a polyester having a Tg of not lower than 63° C., the hydrophilic polyester, or the water absorbing polymer is preferably 25 to 250 μm, more preferably from 40 to 150 μm.

The polyester film according to the forth embodiment of the present invention is comparable or even superior to a conventionally employed PET film in transparency and mechanical strength, i.e., having a haze of not more than 3%, a breaking strength of from 8 to 25 kg/mm², an initial modulus of elasticity of from 200 to 500 kg/mm², and a tear strength of not less than 30 g at a film thickness of 50 μm.

Various physical properties of polyesters used in the present invention and performance properties of photographic films according to the present invention were measured and evaluated according to the following test methods unless otherwise indicated.

1) Tg:
The same as described above.

2) Water Content (A):
A polyester film is conditioned at 25° C. and 50% RH for 10 days. The water content of the thus conditioned film weighing about 8 mg is measured at 150° C. by means of a moisture meter utilizing a Karl Fischer reagent (Karl Fischer method).

3) Degree of Crystallinity (X):
Calculated according to the equation:

$$X(\%)=\{(d-d_A)/(d_c-d_A)\}\times 100$$

wherein $d_A$ is the density of a polyester in a completely amorphous state; $d_c$ is the density of a polyester in a completely crystalline state; and d is the density of a sample.

4) Transparency:
A haze of a film is measured according to ASTM-D 1003-52.

5) Breaking Strength and Initial Modulus of Elasticity:
Measured on a 10 mm wide and 100 mm long specimen according to JIS-Z 1702-1976. The rate of pulling is 300 mm/min for the measurement of breaking strength and 20 mm/min for the measurement of initial modulus of elasticity.

6) Tear Strength:
A 51 mm wide and 64 mm long specimen having a nick of 13 mm in the length direction is torn by using a light load type tear tester (manufactured by Toyo Seiki K.K.), and a reading is taken.

The polyester film support according to the present invention and the photographic film using the same are characterized by their excellent ability to eliminate curling during development processing. In the present invention, such curling elimination properties of a support or a photographic film are evaluated in terms of percent recovery from curling as measured according to the following test method. The support or photographic film of the present invention preferably has a recovery from curling of 50% or more, and particularly 80% or more.

7) Recovery from Curling:
A 35 mm wide and 12 cm long specimen is wound around a core having a diameter of 10 mm, heat-treated at 60° C. and 30% RH for 72 hours, and then released from the core. The specimen is dipped in distilled water at 40° C. for 15 minutes, dried with warm air at 55° C. in a thermostat for 3 minutes under a load of 50 g, and vertically suspended. The length of the specimen is measured to obtain a percent recovery to the original length of 12 cm.

The polyester film support according to the present invention is also characterized by high heat resistance. Heat resistance of the film support is evaluated in terms of percent heat shrinkage and thermal deformation according to the following test methods unless otherwise specified.

8) Percent Heat Shrinkage:
After conditioning at 25° C. and 60% RH for 24 hours, a 35 mm wide and 12 cm long cut specimen is heat-treated in air at 150° C. for 30 minutes in a thermostat, followed by re-conditioning at 25° C. and 60% RH for 24 hours. The length in the longitudinal direction is measured to obtain a percent heat shrinkage.

9) Thermal Deformation:
A 35 mm wide and 12 cm long cut specimen is wound around a core having a diameter of 25 mm, and the end of the roll is fixed with Mylar tape. The specimen in a roll form is heat-treated at 80° C. for 7 hours. The surface unevenness of the thus treated film is observed visually.

10) Stiffness (S):
A 35 mm wide and 100 mm long cut specimen is conditioned at 23° C. and 50% RH for 24 hours, and both ends thereof are joined under the same conditions to make a loop with the emulsion layer side thereof outside. An indentation load is applied onto the loop at a rate of 3.5 mm/min by means of a loop stiffness tester (manufactured by Toyo Seiki K.K.) to obtain a load (g/5 mm) required for indentation to a length of 12 mm. The higher the load, the higher the stiffness.

11) Thermal Resistance (T):
After conditioning at 25° C. and 60% RH for 24 hours, a 35 mm wide and 12 cm long specimen is heat-treated at 80° C. for 7 hours. After heat treatment, the specimen is conditioned again at 25° C. and 60% RH for 24 hours. Then, the length of the specimen is measured to evaluate the shrinkage before and after the heat. The larger the value, the worse the heat-resistance. The measurement was carried out with respect to both the length and the width. The evaluation is shown as an average (percentage) of the values.

Figure 7:
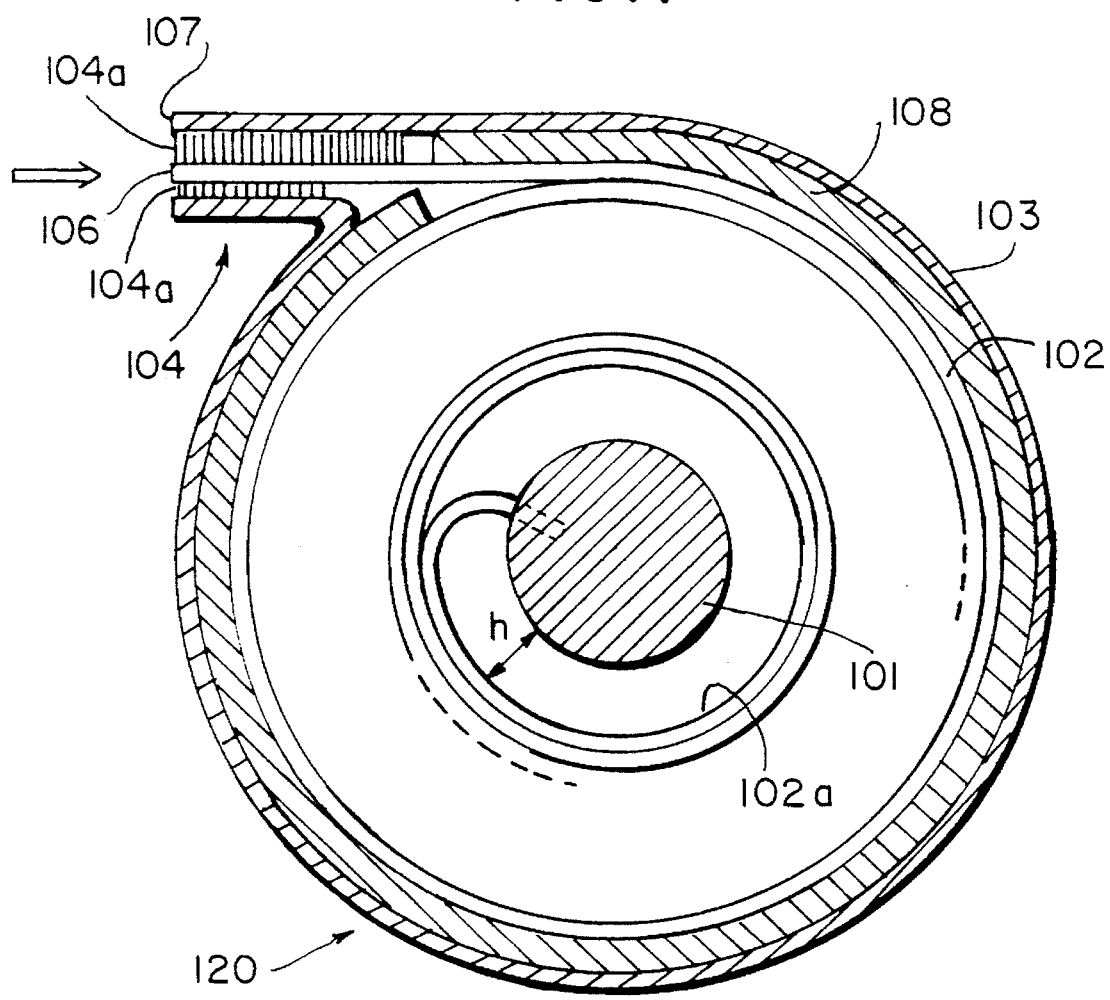
FIG. 7 shows a side view of a cartridge for a photographic film.

12) Liability to Curling:
A 35 mm wide and 1.5 m long photographic film is put in a cartridge of new type as shown in FIG. 7 having an outer diameter of 23 mm and an inner diameter of 21 mm. Spool 101 (shown in FIG. 7) has a diameter of 7 mm. After preserving at 40° C. and 60% RH for 24 hours, the film is released from the cartridge, and the diameter of the outermost periphery is measured under 25° C. and 25% RH. The greater the diameter, the lesser the liability to curling. The evaluation was made on both an undeveloped film and a developed film.

13) Easy Film Feed from Cartridge:
The same photographic film-in-cartridge sample as used in 12) above is conditioned at 25° C. and 70% RH for 3 days. The thus conditioned sample is sealed into a moistureproof bag made of an aluminum/polyethylene composite film under the same temperature and humidity conditions and preserved at 40° C. for 3 days. The sample is taken out of the bag, and the spool is turned at 25° C. and 70% RH to feed the film from the outlet. The torque of the spool on turning is measured. The greater the torque, the poorer the ease of film feed.

14) Easy Pass in Printer:
A 35 mm wide photographic film having been prepared and preserved in the same manner as in above 12) is cut to a length of 50 cm, and three cut pieces are connected together with Cello-Tape. A hundred sets of the connected film are passed through to a printer "FAP-7000" manufactured by Fuji Photo Film Co., Ltd. at 25° C. and 55% RH. Easy pass in printer is evaluated from the frequency of occurrence of jamming in the printer.

15) Output Error on Magnetic Recording:
Magnetic signals are put in a developed photographic film from the back side thereof according to the system disclosed in WO 90-04205, and the signals are reproduced 500 times with a magnetic head at 25° C. and 30% RH to obtain the frequency of occurrence of output errors.

The polyester film support according to the first and fourth embodiments preferably has a percent heat shrinkage of not more than 2.0%, and more preferably not more than 1.5%, and preferably undergoes thermal deformation as slight as a 122 μm thick TAC film, and more preferably as slight as a 100 μm thick PET film.

In the second embodiment of the present invention, stiffness (S), thermal resistance (T), and transmission (K) are limited to the respective specific range to thereby obtain great improvements over the conventional photographic films. In particular, although stiffness of the support has not been given sufficient consideration in the past, it is recognized in the present invention as an important parameter for photographic films. Especially, stiffness in water is a very important characteristic value to process photographic films without jamming in an auto processor. Therefore, the above-described quantitative evaluation of stiffness is indicative of the superiority of the present invention.

In the second embodiment of the present invention, since Tg of the polyester film is a function of equilibrium water content, Tg may become higher as the equilibrium water content increases. This is because a polyester film having a high equilibrium water content is less liable to curling during storage and also easily recovers from curling on water absorption during development processing so that the film is assured of recovery from curling or of reduced liability to curling even if its Tg is high. An equilibrium water content (A) preferably ranges from 0.05 to 2.5%, and more preferably from 0.1 to 2%. When the equilibrium water content falling within this range, the Tg preferably ranges from 55° to 256° C., and more preferably from 55° to 200° C. A degree of crystallinity (X) is a function of Tg and is preferably not less than 25%, and more preferably not less than 35%. Stiffness (S) is 13 g or more, preferably 14 g or more, and more preferably 15 g or more. Thermal resistance (T) is not more than 0.25%, preferably not more than 0.27%, and more preferably not more than 0.29%.

Transmission (K) is not less than 80%, preferably not less than 82%, and more preferably not less than 84%.

In order to improve adhesion and wetting of the coating, the polyester film may be subjected to various surface treatments, such as a corona discharge treatment, a chemical treatment, and a flame treatment. A corona discharge treatment is particularly preferred because of the effect of preventing bleeding of low-molecular weight compounds on the film surface.

In order to improve adhesion to photographic layers such as a light-sensitive layer, a subbing layer is preferably provided on the polyester film support. Such a subbing layer includes a polymer latex layer comprising a styrene-butadiene copolymer or a vinylidene chloride copolymer and a hydrophilic binder layer, such as gelatin, with a hydrophilic binder layer being preferred.

Examples of suitable hydrophilic binders include water-soluble polymers, e.g., gelatin, gelatin derivatives, casein, agar, sodium alginate, starch, polyvinyl alcohol, polyacrylic acid copolymers, and maleic anhydride copolymers; cellulose esters, e.g., carboxymethyl cellulose and hydroxyethyl cellulose; latex polymers, e.g., vinyl chloride copolymers, vinylidene chloride copolymers, acrylate copolymers, vinyl acetate copolymers, and butadiene copolymers; and water-soluble polyesters. The most preferred of them is gelatin.

Swelling agents to be added to the subbing layer for swelling the support include resorcin, chlororesorcin, methylresorcin, o-cresol, m-cresol, p-cresol, phenol, o-chlorophenol, p-chlorophenol, dichlorophenol, trichlorophenol, monochloroacetic acid, dichloroacetic acid, trifluoroacetic acid, and chloral hydrate. Among these, resorcin and p-chlorophenol are preffered.

The subbing layer may contain a gelatin hardening agent, e.g., chromium salts (e.g., chromium alum), aldehyde compounds (e.g., formaldehyde and glutaraldehyde), isocyanate compounds, active halogen compounds (e.g., 2,4-dichloro-6-hydroxy-s-triazine), and epichlorohydrin resins.

The subbing layer may further contain fine particles (e.g., 1 to 10 μm) of inorganic substances, e.g., $SiO_2$ and $TiO_2$, or polymethyl methacrylate copolymers as a matting agent.

The subbing layer can be formed by a well-known coating method, such as dip coating, air knife coating, curtain coating, wire bar coating, gravure coating, and extrusion coating.

The light-sensitive material according to the present invention may contain, in addition to light-sensitive layers, light-insensitive layers, such as an antihalation layer, an intermediate layer, a backing layer, and a surface protective layer.

Binders to be used in the backing layer may be either hydrophobic polymers or hydrophilic polymers such as those used in the subbing layer.

The backing layer may contain antistatic agents, lubricants, matting agents, surface active agents, dyes, and so on. Antistatic agents to be used in the backing layer are not particularly limited and include anionic high polymers containing a carboxylic acid, a carboxylic acid salt, or a sulfonic acid salt, such as those described in JP-A-48-22017, JP-B-46-24159 (the term "JP-B" as used herein means an "examined published Japanese patent application", JP-A-51-30725, JP-A-51-129216, and JP-A-55-95942; and cationic high polymers, such as those described in JP-A-49-121523, JP-A-48-91165, and JP-B-49-24582. Ionic surface active agents to be used in the backing layer also include anionic compounds and cationic compounds, such as those described in JP-A-49-85826, JP-A-49-33630, U.S. Pat. Nos. 2,992,108 and 3,206,312, JP-A-48-87826, JP-B-49-11567, JP-B-49-11568, and JP-A-55-70837.

Most preferable antistatic agents incorporated in the back layer include fine particles of a crystalline metal oxide selected from $ZnO_3$, $TiO_3$, $SnO_3$, $Al_2O_3$, $In_2O$, $SiO_2$, MgO, BaO and $MoO_3$, or complex oxide thereof.

The fine particles of the electrically conductive crystalline metal oxide or complex oxide thereof used in the present invention have a volume resistivity of preferably $10^7$ Ωcm or less, more preferably $10^5$ Ωcm or less and a particle size of from 0.01 to 0.7 μm, more preferably from 0.02 to 0.5 μm.

The fine particles of the electrically conductive crystalline metal oxide or complex oxide thereof used in the present invention can be prepared according to the methods described in JP-A-56-143430 and JP-A-60-258541. There are easy methods, i.e., a method comprising first preparing fine particles of metal oxide by calcining and then heat-treating them in the presence of a different atom to order to improve in electrical conductivity, a method comprising co-existing the different atom on preparing fine particles of metal oxide, and a method comprising introducing oxygen defects into metal fine particles by reducing an oxygen concentration in an atmosphere on calcining. As examples of the different atom, Al, In to ZnO, Nb and Ta to $TiO_2$, Sb, Nb and halogen atoms to $SnO_2$ can be exemplified. The amount of the different atom is preferably from 0.01 to 30 mol %, more preferably from 1 to 10 mol %.

The photographic light-sensitive material of the present invention will be described in more detail below..

The light-sensitive material of the present invention comprises a silver halide emulsion layer, a back layer, a protective layer, an interlayer and an antihalation layer. The layers are formed mainly of hydrophilic colloid.

Examples of a binder to be incorporated in the hydrophilic colloidal layer include proteins such as gelatin, colloidal albumin and casein, cellulose compound such as carboxymethyl cellulose and hydroxyethyl cellulose, saccharide derivatives such as agar-agar, sodium alginate and starch derivative, synthetic hydrophilic colloids such as polyvinyl alcohol, poly-N-vinylpyrrolidone, polyacrylic acid copolymer, polyacrylamide and derivatives thereof and partial hydrolyzates, dextran, vinyl polyacetate, ester polyacrylate and rosin. If necessary, two or more of the colloids may be used in an admixture.

Among the binders, gelatin or its derivatives are used most often. Examples of gelatin include lime-treated gelatin, acid-treated gelatin and enzyme-treated gelatin.

In the present invention, an anionic, nonionic, cationic or betainic fluorine-containing surface active agent may be used in combination.

Examples of such a fluorine-containing surface active agent are described in JP-A-49-10722, JP-A-53-84712, JP-A-54-14224, JP-A-50-113221, JP-A-55-149938, JP-A-54-48520, JP-A-54-14224, JP-A-58-200235, JP-A-57-146248 and JP-A-58-196544, in U.S. Pat. Nos. 4,335,201 and 4,347,308, in British Patents 1,330,356, 1,417,915 and 1,439,402, and JP-B-52-26687, JP-B-57-26719 and JP-B-59-38573.

Preferred examples of these fluorine-containing surface active agents are set forth below:

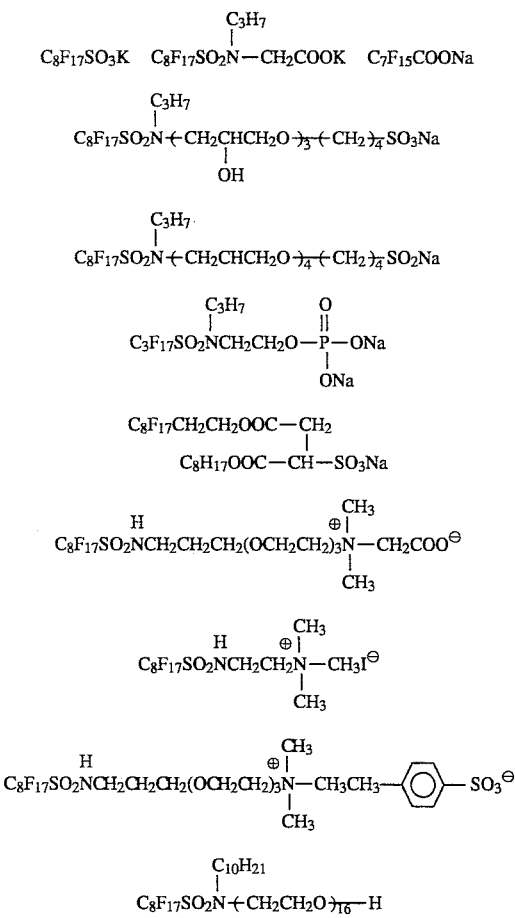

In the present invention, nonionic surface active agents may be used.

Specific examples of nonionic surface active agents which preferably can be used in the present invention are set forth below:

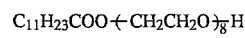
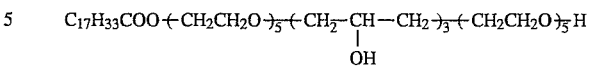
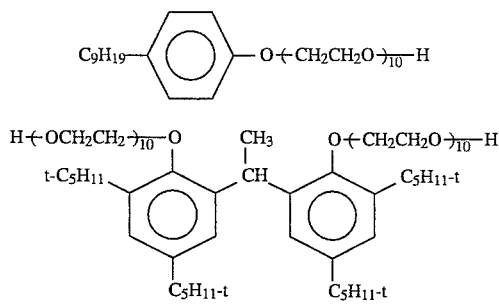

The layer in which the fluorine-containing surface active agent and nonionic surface active agent of the present invention is incorporated is not specifically limited provided it is at least one layer in the photographic light-sensitive material and may be a surface protective layer, emulsion layer, interlayer, subbing layer, back layer or the like.

The amount of the fluorine-containing surface active agent or nonionic surface active agent to be used in the present invention preferably may be in the range of 0.0001 g to 1 g, more preferably 0.0005 g to 0.5 g, and particularly 0.0005 to 0.2 g per $m^2$. Two or more of the surface active agents of the present invention may be used in an admixture.

Further, a polyol compound such as ethylene glycol, propylene glycol and 1,1,1-trimethylol propane or a polyol compound as disclosed in JP-A-54-89626 may be incorporated in the present protective layer or other layers.

Other known surface active agents may be incorporated into the photographic layers, singly or in combination. The surface active agents normally are used as coating aids but may be often used for other purposes, e.g., emulsion dispersion, sensitization and improvement of photographic properties.

In the present invention, a lubricating composition such as modified silicone as disclosed in U.S. Pat. Nos. 3,079,837, 3,080,317, 3,545,970 and 3,294,537, and in JP-A-52-129520 may be incorporated into the photographic layers.

The photographic light-sensitive material of the present invention can comprise a polymer latex in the photographic layers as described in U.S. Pat. Nos. 3,411,911 and 3,411,912, and in JP-B-45-5331.

The silver halide emulsion layer and other hydrophilic colloidal layers in the photographic light-sensitive material of the present invention can be cured with various organic or inorganic curing agents, singly or in combination.

Typical examples of silver halide color photographic materials to which the present invention preferably can be applied include color reversal film and color negative film. In particular, general purpose color negative films are preferred color photographic light-sensitive materials.

The present invention will be further described with reference to general purpose color negative films.

The present silver halide color photographic light-sensitive material can comprise at least one blue-sensitive layer, at least one green-sensitive layer and at least one red-sensitive layer on a support. The number of silver halide emulsion layers and light-insensitive layers and the order of arrangement of the layers are not limited specifically.

In a typical embodiment, the present silver halide photographic material comprises light-sensitive layers consisting of a plurality of silver halide emulsion layers having substantially the same color sensitivity and different light sensitivities on a support. The light-sensitive layers are unit light-sensitive layers having color sensitivity to any of blue light, green light and red light. In a multi-layer silver halide color photographic material, these unit light-sensitive layers are normally arranged in the order of red-sensitive layer, green-sensitive layer and blue-sensitive layer as viewed from the support. However, the order of arrangement optionally can be reversed depending on the application. Alternatively, two unit light-sensitive layers having the same color sensitivity can be arranged with a unit light-sensitive layer having a different color sensitivity interposed between them.

Light-insensitive layers such as various interlayers can be provided between the silver halide light-sensitive layers and as the uppermost layer and lowermost layer.

The interlayers can comprise couplers, DIR compounds or the like as described in JP-A-61-43748, 59-113438, 59-113440, 61-20037 and 61-20038. The interlayers can further comprise a color stain inhibitor as commonly used.

The plurality of silver halide emulsion layers constituting each unit light-sensitive layer are described in West German Patent 1,121,470, in British Patent 923,045, in JP-A-57-112751, JP-A-62-200350, JP-A-62-206541, JP-A-62-206543, JP-A-56-25738, JP-A-62-63936 and JP-A-59-202464, and in JP-B-55-34932, and JP-B-49-15495.

Silver halide grains in the photographic emulsions may be regular grains having a regular crystal form, such as a cube, octahedron and tetradecahedron, or those having an irregular crystal form such as sphere and tablet, those having a crystal defect such as twinning plane, or those having a combination of the crystal forms.

The silver halide grains may be either fine grains of about 0.2 μm or smaller in diameter or giant grains having a projected area diameter or up to about 10 μm. The emulsion may be either a monodisperse emulsion or a polydisperse emulsion.

The preparation of the silver halide photographic emulsion which can be used in the present invention can be accomplished by any suitable method as described in Research Disclosure No. 17643 (December 1978), pp. 22–23, "I. Emulsion Preparation and Types", and No. 18716 (November 1979), page 648, P. Glafkides, "Chimie et Physique Photographique", Paul Montel (1967), G. F. Duffin, "Photographic Emulsion Chemistry", Focal Press (1966), and V. L. Zelikman et al., "Making and Coating Photographic Emulsion Focal Press", (1964).

Furthermore, monodisperse emulsions as described in U.S. Pat. Nos. 3,574,628 and 3,655,394, and in British Patent 1,413,748 preferably can be used in the present invention.

Tablet grains having an aspect ratio of about 5 or more can be used in the present invention. The preparation of such tablet grains can be easily accomplished by any suitable method as described in Gutoff, "Photograpahic Science and Engineering", vol. 14, pp. 248–257, (1970) in U.S. Pat. Nos. 4,434,226, 4,414,310, 4,433,048 and 4,439,520, and in British Patent 2,112,157.

The individual silver halide crystals may have either a homogeneous structure or a heterogeneous structure composed of a core and an outer shell differing in halogen composition or may have a layered structure. Furthermore, the grains may have fused thereto a silver halide having a different halogen composition or a compound other than silver halide, e.g., silver thiocyanate, lead oxide etc. by an epitaxial junction.

Mixtures of grains having various crystal forms also may be used.

The silver halide emulsion to be used in the present invention normally is subjected to physical ripening, chemical ripening and spectral sensitization. The effectiveness of the present invention become particularly remarkable when an emulsion sensitized with a gold compound and a sulfur-containing compound is used. Additives to be used in the steps are described in Research Disclosure Nos. 17643 and 18716 as tabulated below.

Known photographic additives which can be used in the present invention also are described in the above cited two research disclosures as shown in the table.

| Kind of additive | RD17643 | RD18716 |
|---|---|---|
| 1. Chemical sensitizer | p. 23 | p. 648 RC* |
| 2. Sensitivity increasing agent | | " |
| 3. Spectral sensitizer and supersensitizer | pp. 23–24 | p. 648 RC–<br>p. 649 RC |
| 4. Brightening agent | p. 24 | |
| 5. Antifoggant and stabilizer | pp. 24–25 | p. 649 RC– |
| 6. Light absorbent, filter dye, and ultraviolet absorbent | pp. 25–26 | p. 649 RC–<br>p. 650 LC* |
| 7. Stain inhibitor | p. 25 RC | p. 650 LC–RC |
| 8. Dye image stabilizer | p. 25 | |
| 9. Hardening agent | p. 26 | p. 651 LC |
| 10. Binder | p. 26 | " |
| 11. Plasticizer and lubricant | p. 27 | p. 650 RC |
| 12. Coating aid and surface active agent | pp. 26–27 | p. 650 RC |

*RC and LC as used above mean "right column" and "left column", respectively.

To inhibit deterioration in photographic properties due to formaldehyde gas, a compound capable of reacting with and solidifying formaldehyde as disclosed in U.S. Pat. Nos. 4,411,987 and 4,435,503 preferably can be incorporated in the light-sensitive material.

In the present invention, various color couplers can be used. Specific examples of the color couplers are described in the patents described in the above cited Research Disclosure No. 17643, VII-C to G.

For examples, specific examples of high boiling solvents used in an oil-water dispersion process are described in U.S. Pat. No. 2,322,027.

The incorporation of the couplers in the light-sensitive material can be accomplished by any suitable known dispersion method.

Specific examples of high boiling solvents having a boiling point of 175° C. or higher under normal pressure to be used in the oil-in-water dispersion process include phthalic ester, phosphoric ester, phosphonic ester, benzoic ester, amide, alcohol, phenol, aliphatic carboxylic ester, aniline derivative and hydrocarbon. An organic solvent having a boiling point of about 30° C. or higher, preferably 50° C. to about 160° C. can be used as an auxiliary solvent. Typical examples of such an organic solvent include ethyl acetate, butyl acetate, ethyl propionate, methyl ethyl ketone, cyclohexanone, 2-ethoxyethyl acetate and dimethylformamide.

The process and effects of the latex dispersion method and specific examples of latexes to be used in dipping are described in U.S. Pat. No. 4,199,363, West German Patent Application (OLS) 2,541,274, and 2,541,230.

In the present light-sensitive material, the total thickness of all hydrophilic colloid layers on the emulsion side is preferably in the range of 28 μm or less. The film swelling rate ($T_{1/2}$) is preferably in the range of 30 seconds or less. In the present invention, the film thickness is determined after being stored at a temperature of 25° C. and a relative humidity of 55% for 2 days. The film swelling rate $T_{1/2}$, can be determined by a method known in the art, e.g., by means of a swellometer of the type as described in A. Green et al, "Photographic Science and Engineering", vol. 19, No. 2, pp. 124–129. $T_{1/2}$ is defined as the time taken until half the saturated film thickness is reached wherein the saturated film thickness is 90% of the maximum swollen film thickness reached when the light-sensitive material is processed with a color developer at a temperature of 30° C. over 195 seconds.

The film swelling rate $T_{1/2}$ can be adjusted by adding a film hardener to gelatin as a binder or altering the ageing condition after coating. The percentage swelling of the light-sensitive material is preferably in the range of 150 to 400%. The percentage swelling can be calculated from the maximum swollen film thickness determined as described above in accordance with the equation: (maximum swollen film thickness–film thickness)/film thickness.

The thus prepared photographic material is cut to a prescribed width, e.g., 35 mm for J135 roll films and 10 mm for J110 roll films, perforated, and put in a prescribed cartridge.

The color photographic materials according to the present invention can be development processed according to usual methods as described in RD No. 17643, pp. 28–29and RD No. 18716, p. 615, left and right columns.

For the purpose of simplifying and speeding up processing, the silver halide color light-sensitive material may contain a color developing agent, preferably in the form of a precursor thereof. Examples of color developing agent precursors include indoaniline compounds described in U.S. Pat. No. 3,342,597 and Schiff base compounds described in U.S. Pat. No. 3,342,599, RD No. 14850, and RD No. 15159.

A novel photographic system in which the photographic material of the present invention is preferably used to produce particularly excellent effects is hereinafter described.

This novel system is characterized by (1) ease in loading into a camera and (2) having a magnetic recording layer in the photographic film.

As previously described, the operation of fitting the film leader of a roll film in a conventional cartridge onto a film feeding member is not only troublesome but needs some skill, often resulting in a mistake, such as exposure of an intact film. There has thus been a demand for a camera system needing no such operation. Such a system must have a mechanism by which a photographic film can be fed from the inside of a cartridge, and the leading end of the film can be fit on a film feeding member, thus needing no manual operation of engaging the film leader onto the film feeding member. A conventional cartridge does not meet the requirements of such a system, and a cartridge of new type must be used. The cartridge of this new type will be explained below.

The above-described cartridge according to the present invention is mainly made of synthetic resins. If desired, a plasticizer is added to the synthetic resin molding material. Suitable plasticizers typically include trioctyl phosphate, tributyl phosphate, dibutyl phthalate, diethyl sebacate, methyl amyl ketone, nitrobenzene, γ-valerolactone, di-n-octyl succinate, bromonaphthalene, and butyl palmitate.

Specific examples of suitable synthetic resins for obtaining the cartridge are polystyrene, polyethylene polypropylene, polymonochlorotrifluoroethylene, vinylidene chloride resins, vinyl chloride resins, vinyl chloride-vinyl acetate copolymer resins, acrylonitrile-butadiene-styrene copolymer resins, methyl methacrylate resins, vinyl formal resins, vinyl butyral resins, polyethylene terephthalate, Teflon, nylon, phenol resins, and melamine resins. Preferred of these are polystyrene, polyethylene, and polypropylene.

These resins may contain various antistatic agents, such as carbon black, metal oxide particles, and nonionic, anionic, cationic or betaine type surface active agents or polymers. Known cartridges containing these antistatic agents are described in JP-A-1-312537 and JP-A-1-312538. The antistatic cartridge preferably has a resistance of not more than $10^{12}$ Ω at 25° C. and 25% RH.

Carbon black or pigments are generally added to the resin molding material to provide the resulting cartridge with light screening properties.

The cartridge may be the standard size (25 mm diameter) as currently adopted or may have its diameter reduced to 22 mm or less, and preferably 14 to 20 mm, for allowing size reduction of cameras. The volume of the cartridge is not more than 30 cm$^2$, preferably not more than 25 cm$^2$, and more preferably not more than 20 cm$^2$. The weight of the synthetic resin to be used in the cartridge and its case is from 1 to 25 g, and preferably from 5 to 15 g. The ratio of the internal space of the cartridge case to the volume of the cartridge and its case is from 4 to 0.7, and preferably from 3 to 1.

In the case of a cartridge for J135 color light-sensitive material which is a preferred embodiment in the present invention, the total weight of the resin used in the cartridge and its case is generally from 1 to 25 g, and preferably from 5 to 15 g. The cartridge for use in the present invention is not particularly limited in its shape.

When the above-described new type of cartridge system is employed, it is desirable to use a new type of camera matching the cartridge.

Figure 2:
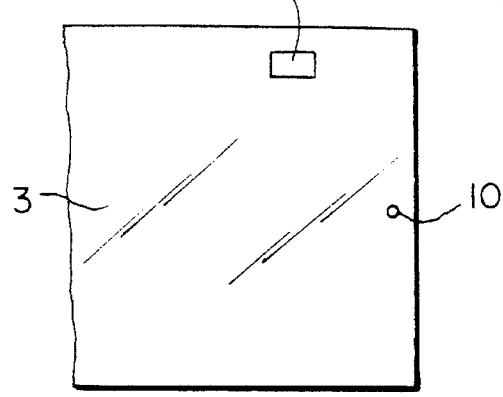
FIG. 2 shows a plan view of an edge of the photographic film shown in FIG. 1.
Figure 3:
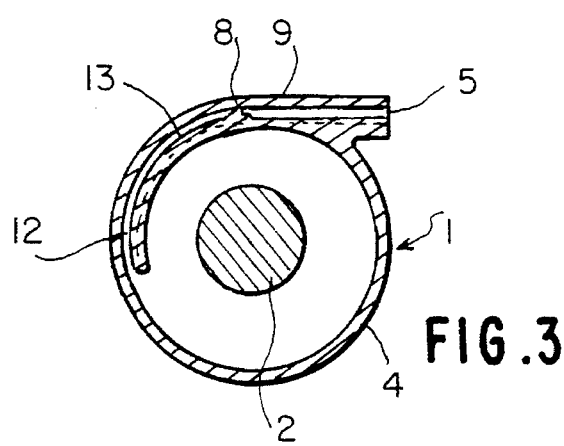
FIG. 3 shows a sectional view of the cartridge of FIG. 1.
Figure 4:
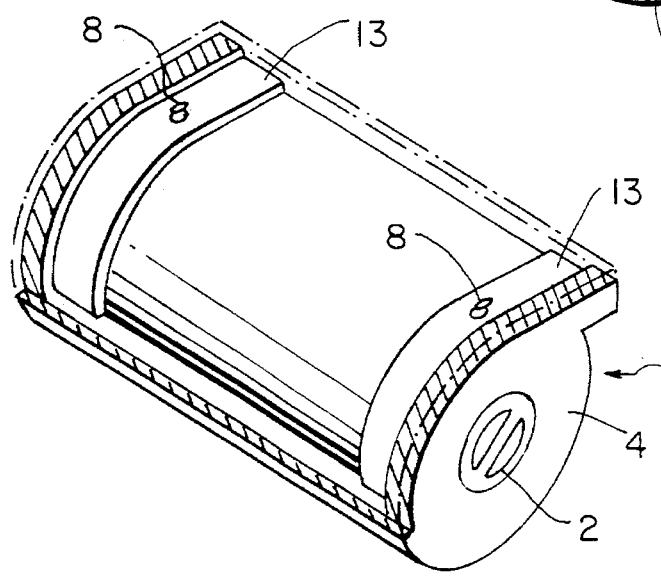
FIG. 4 shows a partially cutaway view of the cartridge of FIG. 1.

Specific examples of the above-described new cartridge system will be described by referring to the accompanying drawings. FIG. 1 provides example of the cartrige, and the inside structure of the example is shown in FIGS. 2 to 4.

As shown in FIG. 1, the cartridge 1 has a generally cylindrical main body portion 4 in which is rotatably mounted a spool 2 on which the film 3 is wound. The cartridge 1 has an integrally formed mouth portion 5 extending tangentially from the side of the main body portion 4. The mouth portion 5 defines an exit slit through which the film 3 is pulled out from the cartridge. As depicted in FIG. 2, the leading end of the film 3 has a hole 10 formed at the center thereof which aligns with a cutout 11 in the mouth portion 5 of the cartridge 1. The film 3 has perforation 7 formed along its edge. As shown in FIG. 3 and 4, rail-like guides 13 are provided along the sides of the interior of the mouth portion 5. Protrusions 8 having a peak part 9, formed on the guides 13, protrude in the direction of movement of the film as the film is pulled out of the cartridge 1, through the film passageway 12.

Figure 5:
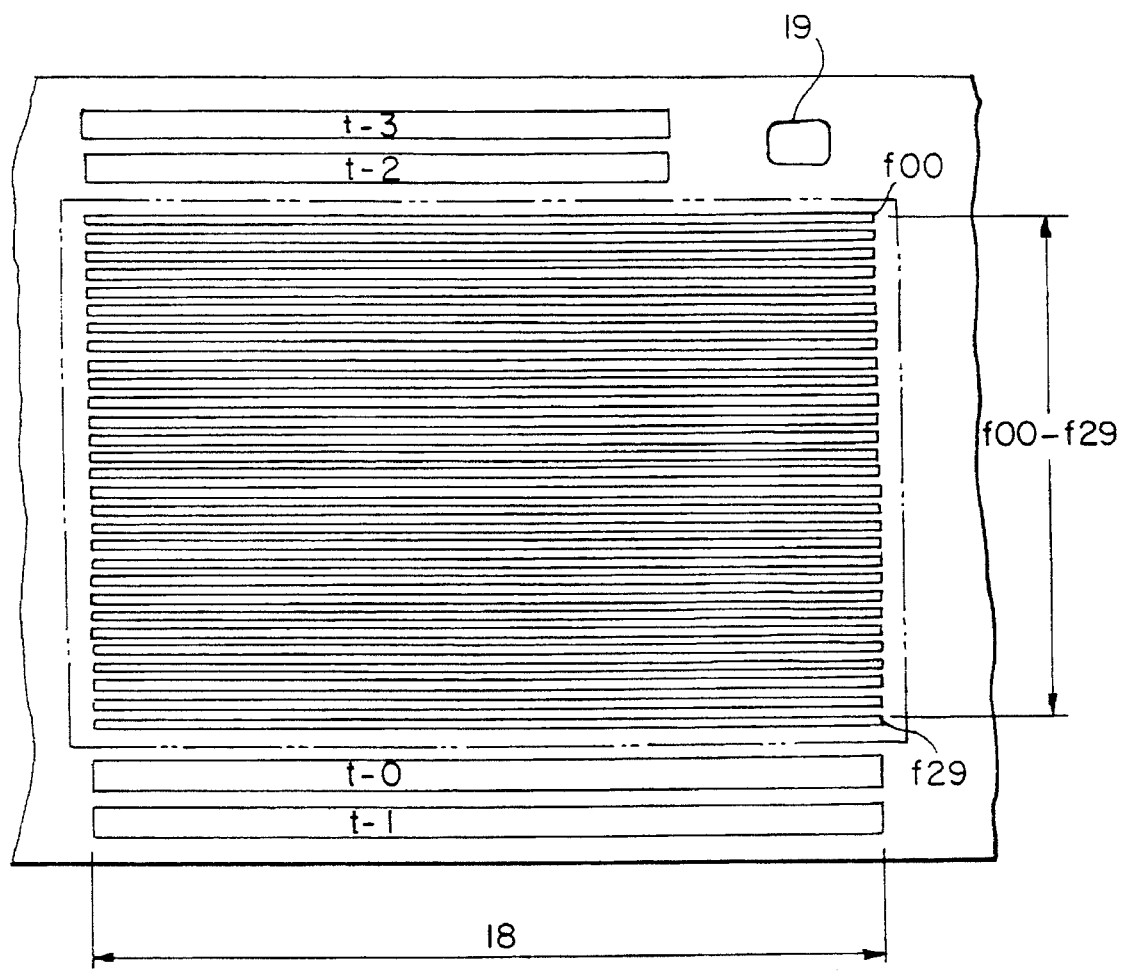
FIG. 5 shows a plan view of a magnetic recording track layer in a back layer of a photographic film.
Figure 6:
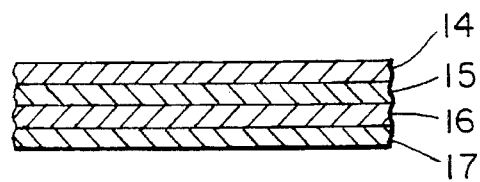
FIG. 6 shows a sectional view of a magnetic recording track layer in a back layer of a photographic film.

A photographic film having a magnetic recording track (hereinafter described) is shown in FIGS. 5 and 6 (14: an emulsion constituting layer, 15: a support, 16: a transparent magnetic recording layer, 17: a static charge preventing layer+a scuffing resistance layer+a slip layer, 18: one frame, 19: a perforation, t-0 to t-3: magnetic recording tracks, and $f_{00}$ to $f_{29}$: magnetic recording tracks).

Figure 8:
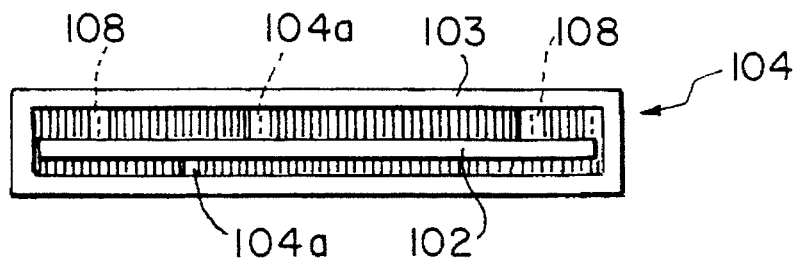
FIG. 8 shows a front view of the cartridge of FIG. 7.

FIGS. 7 and 8 show another example of the new cartridge system in which the end of a roll film can be fed from the inside of the cartridge by turning the spool. The cartridge of this type is proposed in Japanese Patent Application No.

Hei-1-21862. Cartridge 120 is comprised of spool 101, photographic film 102 which is wound around spool 101 in a roll form with one end being engaged by spool 101 and cartridge body 103. Spool 101 is attached to the inside of cartridge body 103 in such a manner that it can be rotated on its axis by any member provided outside of cartridge body 103. Cartridge body 103 has film outlet 104 through which photographic film 102 is supplied. Onto the inner side of outlet 104 is attached light shielding member 104a for protecting the inside of cartridge body 103 from light exposure.

A pair of ribs 108 having a width of about 15 to 20% of the film width are provided on the inner side of cartridge body 103 along the circumferential direction at the positions of both edges (in the width direction) of film 102. Each rib 108 has an opening to outlet 104 so that film 102 be fed therethrough from outlet 104. In this example, the position of film end 106 of film 102 is brought into line with outlet end 107.

The pair of ribs 108 are in contact with the outer side of the roll of film 102 to press it so as to maintain film 102 in a tightly wound state around spool 101.

Figure 9:
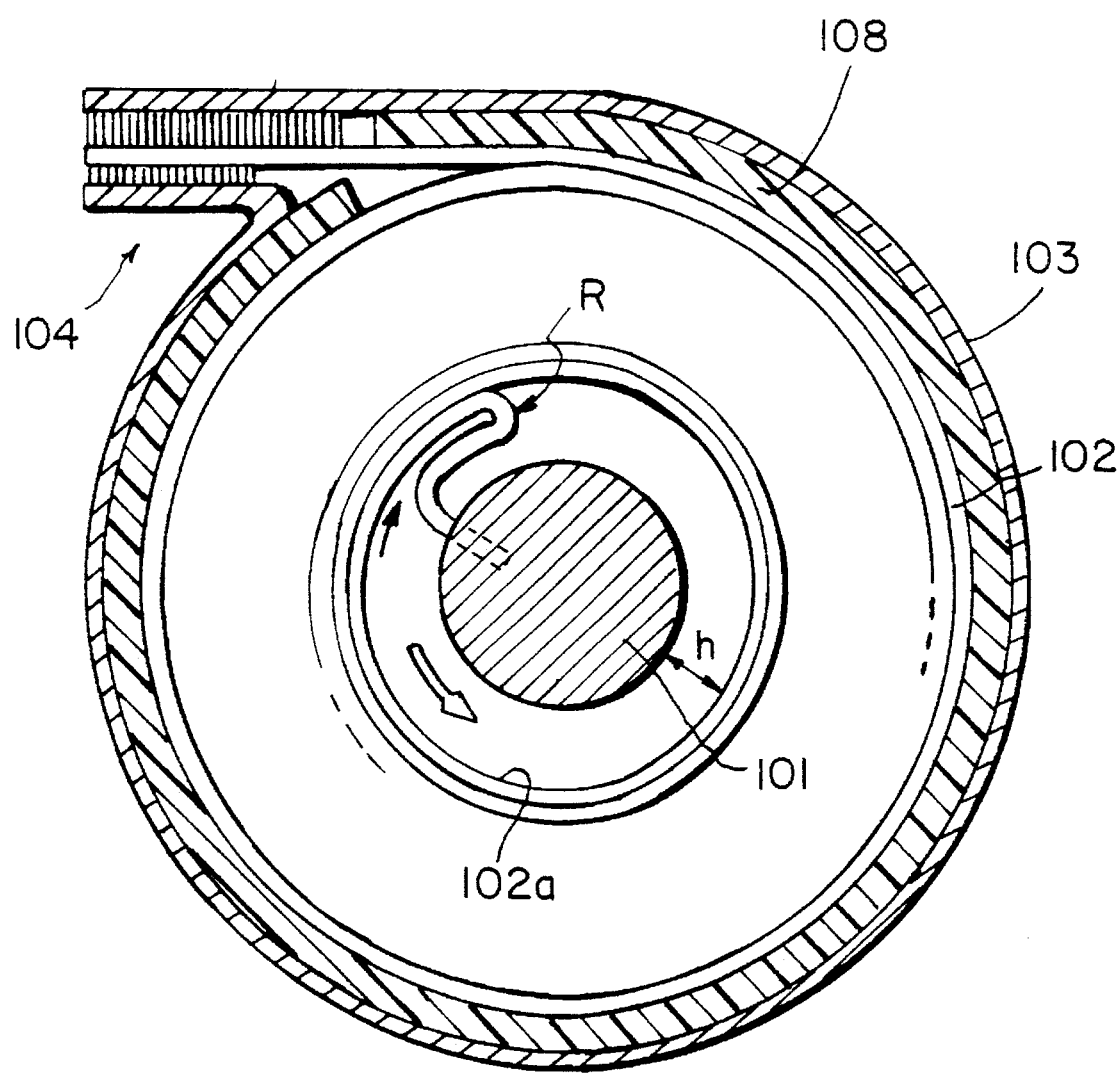
FIG. 9 shows a side view of a cartridge for a photographic film.

The outer diameter of spool 101 is determined as follows. It is difficult to wind film 102 tightly around spool 101 with its innermost side 102a being in contact with the periphery of spool 101, and a gap (h) is unavoidably formed between film innermost side 102a and spool 101. Should the gap (h) be too large, film 102 goes back (R: reversion) as shown in FIG. 9. Therefore, the outer diameter of spool 101 should be set so that the gap (h) between film innermost side 102a and spool 101 may be within 2 mm. That is, $$b/2 = a/2 + h + c \cdot d + t$$

wherein a is the outer diameter of spool, b is the inner diameter of cartridge body, t is the thickness of the rib, c is the thickness of film, and d is the number of turns of film (dependent on film length), Accordingly, $$a/2 = b/2 - t - h - c \cdot d,$$

which leads to:

$$h = b/2 - a/2 - c \cdot d - t$$

Then h≦2 mm is inserted to the equation, and the outer diameter of the spool (a) can be calculated from the formula:

$$b/2 - t - c \cdot d - 2 \leq a/2$$

With the gap (h) falling within 2 mm, the reversion of film 102 can be prevented by setting the torque of the spool at 0.8 kgf·cm or less.

Rib 108 attached to the inner surface of cartridge body 103 does not always need to extend over the entire circumference and may be provided on a part of it. Further, rib 108 may be provided over the entire width of the film.

Rib 108 should be made of a material which does not cause damage to the surface of film 102, such as a plastic. A material having elasticity to some extent, e.g., a urethane resin, may be chosen. The thickness of rib 108 is determined so that film 102 tightly wound around spool 101 and put in cartridge body 103 may compress rib 108, then the outer side of the film roll is pressed back by the elastic force of compressed rib 108. Thus, even when film 102 has been pulled out of cartridge body 103 to a considerable length and the outer diameter of the film roll decreases, film 102 can be maintained in a tightly wound state by the interaction between film 102 and rib 108.

The mode of light shielding at outlet 104 is not limited. For example, a light shielding member made of felt may be attached, or the film outlet may have an open-and-close mechanism so that it is kept closed until necessary. Film end 106 does not always need to be set at the line of tip 107 of film outlet 104 as long as it is inside cartridge body 103. Film end 106 is preferably within the portion of outlet 104.

Figure 10:
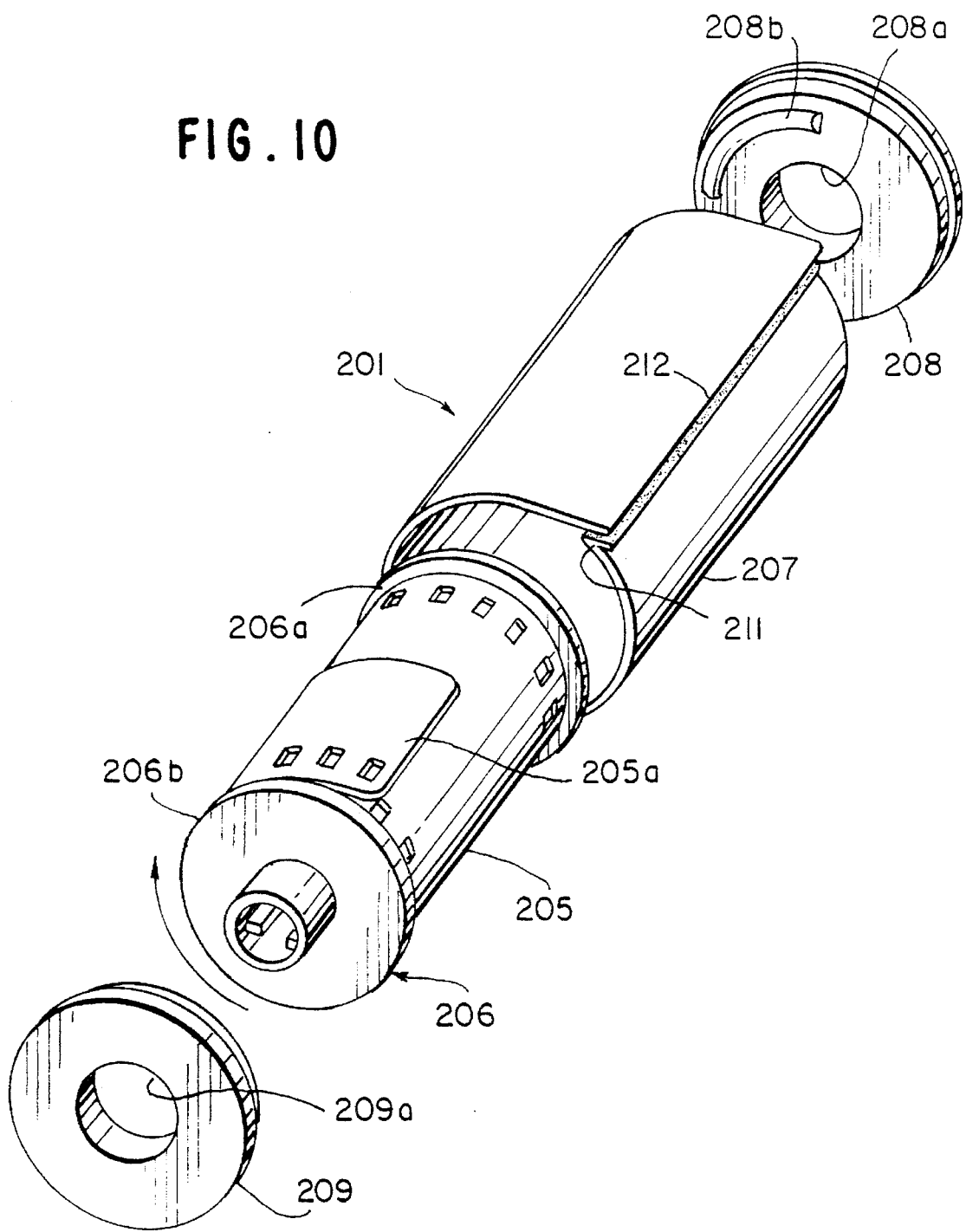
FIG. 10 shows a general view of a cartridge for a photographic film.
Figure 11:
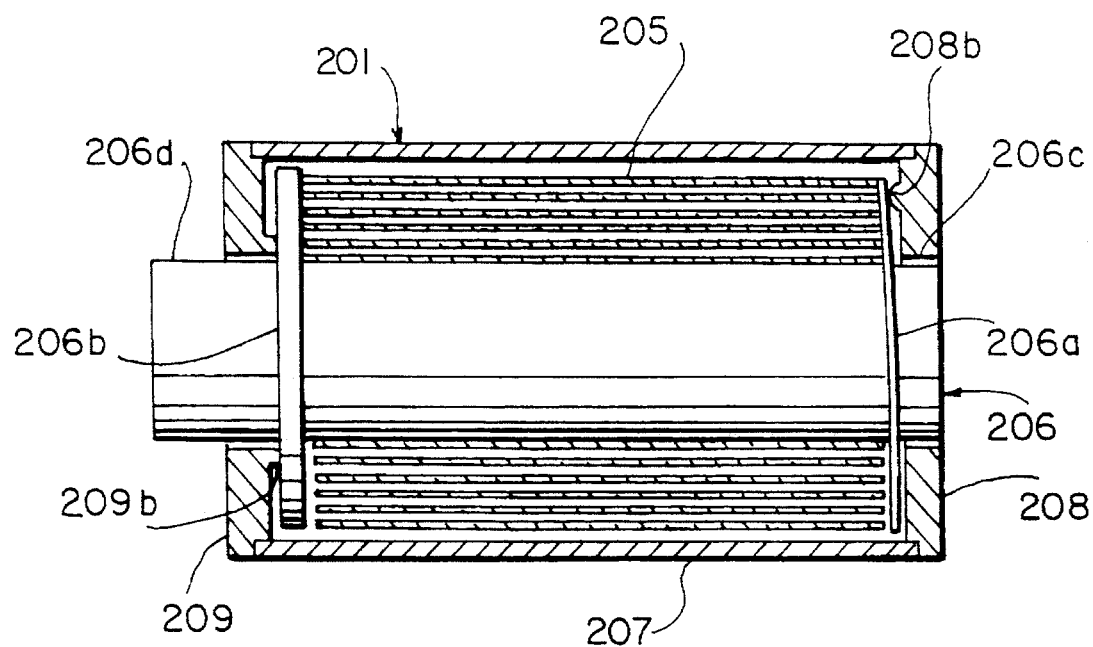
FIG. 11 shows an inside view of a cartridge for a photographic film.

A still further example of the new cartridge system is shown in FIGS. 10 to 11. This is a system disclosed in JP-A-3-37645, in which a spool has a modified flange so that it rotates to feed the film while pressing the edge of the roll film at the periphery thereof. Cartridge 201 is comprised of spool 206 having around it a roll of photographic film 205, cartridge body 207, and side plates 208 and 209 which function to hold spool 206 in a rotatable state and to shut cartridge body 207 from both sides against light.

Spool 206 has flange 206a having a reduced thickness so as to have flexibility and flange 206b having an increased thickness and having no flexibility, all integrally molded. The whole length of photographic film 205 is wound up to the end 205a around spool 206, with one end being fixed to spool 206 between flanges 206a and 206b, to make a roll in such a manner that each edge of the film roll in the width direction skirts along the inner side of flange 206a or 206b. Cartridge body 207 has film outlet 212 to which light shielding member 211 (made of, for example, teremp) is attached.

Side plate 208 has a bearing hole 208a in the center for spool end 206c (see FIG. 11) and in the inner side thereof long projection 208b for pressing part of flange 206a. Side plate 209 has a bearing hole 209a in the center thereof for spool end 206d and in the vicinity of bearing hole 209a projection 209b (see FIG. 11) for reducing friction between the inner side of side plate 209 and flange 206b.

In FIG. 11, the inner size of projections 208b and 209b is smaller than the outer size of flanges 206a and 206b, respectively (the position of projections 208b and 209b is within the diameter of flanges 206a and 206b, respectively). Projection 208b presses part of flexible flange 206a to cause deformation whereby the outer part of the roll of film 205 is held between flanges 206a and 206b more firmly than the inner part. Accordingly, on rotating spool 206 to direction A indicated in FIG. 10, film end 205a is fed out of cartridge body 207 through outlet 212 by the frictional engagement between flanges 206a, 206b and both edges of film 205.

Alternatively, the inner size of long projection 208b and projection 209b may be greater than the outer size of flanges 206a and 206b, respectively. This being the case, an outside member of a camera is provided to press spool 206 from the side of flange 206b toward the direction of flange 206a whereby the inner size of flanges 206a and 206b becomes smaller than the outer diameter of film roll 205, becoming capable of pressing both edges of the film roll. As a result, film 205 can be fed out of cartridge body 207 by rotation of spool 206.

Figure 12:
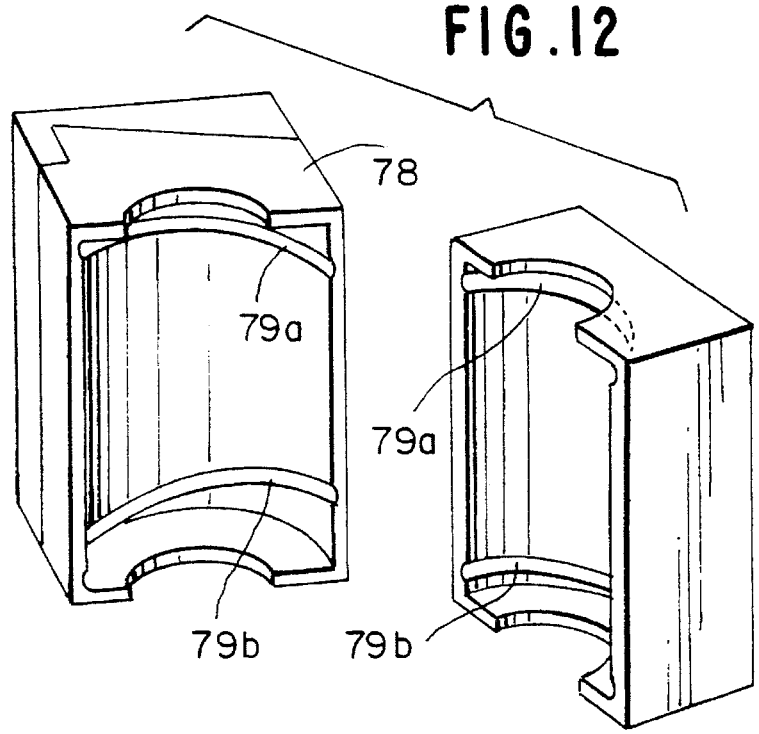
FIG. 12 shows an outside case portion of a cartridge for a photographic film.

In addition, the cartridges described in U.S. Pat. Nos. 4,834,306, 4,846,418, and 4,832,275 as shown in FIGS. 12, 13, and 14 are also preferable in the present invention.

In the example shown in these figures, photographic film 76 is tightly wound around spool 75, and the film roll is maintained tight by a pair of rings 77a and 77b positioned at both edges of the film roll. In the inner side of cartridge body 78, grooves 79a and 79b to which rings 77a and 77b are fit are formed making an angle with the axial direction of cartridge body 78. Accordingly, rings 77a and 77b contact the outer surface of the roll of film 76 making an angle with the axial direction of spool 75 to thereby prevent loosening of the roll. Rings 77a and 77b are rotatable while sliding in grooves 79a and 79b, respectively.

Being maintained tightly wound around spool 75 by rings 77a and 77b, photographic film 76 is fed out through the outlet (not shown) on rotating spool 75 to the direction opposite to the film winding direction.

The second characteristic of the above-described new photographic system resides in that the photographic film has a magnetic recording layer on which various information can be recorded.

The magnetic recording layer preferably have a coercive force of 400 Oe or more from the point of view of retaining the magnetically recorded information during user's handling.

Conventional photographic materials are scarcely capable of recording various information of photographing, such as the date and weather conditions of photographing, ratio of enlargement, and number of prints. The date of taking the photograph is the only information that can be recorded on the state-of-the art photographic materials by an optical technique. Also at the time of printing, it has been impossible to add any information into the photographic material, which has been a great bar to speeding up processing and reducing cost.

Recording various information on photographic materials is a very important means for further improving camera operation performance. A magnetic recording system is not only capable of arbitrarily recording and reproducing information inexpensively and has been studied as such a means. For example, it is known that photographic materials comprising a transparent support having provided on the back side thereof a magnetic recording layer which has sufficient transparency for taking photographs and gives no adverse influence on granularity can be obtained by properly selecting the amount, size, etc. of a magnetic powder dispersed in the magnetic recording layer, as disclosed in U.S. Pat. Nos. 3,782,947, 4,279,945, and 4,302,523. Signal input systems for such a magnetic recording layer are also known as disclosed in WO 90-4205 and WO 90-04212.

These techniques of producing a photographic material having a magnetic recording layer thereon combined with the techniques of signal processing on such a magnetic recording layer make it feasible to record various information on a photographic material, which has been difficult to achieve with ordinary photographic materials. That is, various information such as the date and time of taking a photograph, conditions of photographing (e.g., weather, lighting, and reduction/enlargement ratio), and instructions of development or printing (e.g., number of re-prints, portion where a photographer wants to zoom in, and any other messages) can now be put in a magnetic recording layer of a photographic material. Further, such photographic films with a magnetic recording layer are expected as a means for directly forming an image on a TV/video set.

Such photographic materials having a magnetic layer can be prepared by coating a magnetic recording layer on the polyester support according to the present invention. The magnetic recording layer may be a transparent layer formed over the entire surface of the support or a transparent or opaque layer formed on the support in stripes.

Ferromagnetic powders to be used in the magnetic recording layer include ferromagnetic iron oxide, Co-doped ferromagnetic iron oxide, ferromagnetic chromium dioxide, ferromagnetic metals, ferromagnetic alloys, and barium ferrite.

The ferromagnetic alloys include those having a metal content of at least 75% by weight, at least 80% by weight of the metal content comprising at least one ferromagnetic metal or alloy (e.g., Fe, Co, Ni, Fe—Co, Fe—Ni, Co—Ni, Co—Fe—Ni) and up to 20% by weight of the metal content comprising other metallic components (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, Bi). The ferromagnetic metal content may contain a small amount of water, a hydroxide, or an oxide.

The ferromagnetic powders can be prepared by known processes. The shape and size of the ferromagnetic powders are not particularly limited. For example, the shape may be any of an acicular form, a granular form, a spherical form, a cubic form, a tabular form, etc., with an acicular form and a tabular form being preferred for their electromagnetic conversion characteristics. While not limiting, the ferromagnetic powder preferably has a crystallite size of not more than 400 Å and a BET specific surface area of not less than 20 $m^2/g$, and particularly not less than 30 $m^2/g$. The pH and surface treatments of the ferromagnetic powder are not particularly limited. For example, the powder may be surface-treated with a substance containing titanium, silicon, aluminum, etc. or an organic adsorbing compound containing a carboxyl group, a sulfo group, a sulfuric ester group, a phospho group, a phosphoric ester group, and a nitrogen-containing heterocyclic ring, e.g., benzotriazole. A preferred pH range of the ferromagnetic powder is from 5 to 10. A divalent iron to trivalent iron ratio of the ferromagnetic iron oxide powder is not particularly limited.

The ferromagnetic powder is added in an amount of from $4\times10^{-4}$ to 3 g, preferably from $10^{-3}$ to 2 g, and more preferably from $4\times10^{-3}$ to 1 g, per $m^2$ of a transparent support.

Binders which can be used in the magnetic recording layer include known resin binders conventionally employed in general magnetic recording layers, such as thermoplastic resins, thermosetting resins, radiation-curable resins, reactive resins, and mixtures thereof. Binders are unnecessary where a magnetic recording layer is formed by vacuum deposition.

The above-described binder resins usually have a Tg of from –40° to 150° C. and a weight average molecular weight of from 10,000 to 300,000, and preferably from 10,000 to 100,000.

Examples of suitable thermoplastic resins as binders include vinyl copolymers, e.g., vinyl chloride-vinyl acetate copolymers, copolymers of vinyl chloride, vinyl acetate, vinyl alcohol, maleic acid and/or acrylic acid, vinyl chloride-vinylidene chloride copolymers, vinyl chloride-acrylonitrile copolymers, and ethylene-vinyl acetate copolymers; cellulose derivatives, e.g., nitrocellulose, cellulose acetate propionate, and cellulose acetate butyrate; acrylate resins, polyvinyl acetal resins, polyvinyl butyral resins, polyester polyurethane resins, polyether polyurethane, polycarbonate polyurethane resins, polyester resins, polyether resins, polyamide resins, amino resins; rubbery resins, e.g., styrenebutadiene resins and butadiene-acrylonitrile resins; silicone resins, fluorine-containing resins; and biodegradable binder resins.

The radiation-curable resins include those comprising the above-mentioned thermoplastic resins having bonded thereto a radiation-curable functional group containing a carbon-carbon unsaturated bond, e.g., an acryloyl group and a methacryloyl group.

The above-mentioned binder resins may have incorporated into them a polar group, e.g., an epoxy group, COOM, OH, $NR_2$, $NR_3X$, $SO_3M$, $OSO_3M$, $PO_3M_2$, and $OPO_3M_2$ (wherein M represents a hydrogen atom, an alkali metal, or ammonium; a plurality of M per group may be the same or different; and R represents a hydrogen atom or an alkyl group).

These binder resins may be used either individually or in combination of two or more. An isocyanate type known crosslinking agent and/or a radiation-curing vinyl monomer may be added for curing treatment.

Hydrophilic binders may also be used in the magnetic recording layer. Usable hydrophilic binders are described in RD No. 17643, p. 26, RD No. 18716, p. 651 and include water-soluble polymers, e.g., gelatin, gelatin derivatives, casein, agar, sodium alginate, starch, polyvinyl alcohol, polyacrylic acid copolymers, and maleic anhydride copolymers; cellulose esters, e.g., carboxymethyl cellulose and hydroxyethyl cellulose; latex polymers, e.g., vinyl chloride copolymers, vinylidene chloride copolymers, acrylic ester copolymers, vinyl acetate copolymers, and butadiene copolymers; and water-soluble polyesters. The most preferred of these hydrophilic binders is gelatin.

Gelatin may be any of alkali (lime)-processed gelatin which is obtained by extraction preceded by exposure to alkalies; acid-processed gelatin which is obtained by extraction preceded by exposure to acids; double-processed gelatin which is obtained by extraction preceded by exposure to both alkalies and acids; and enzyme-processed gelatin. If desired, part of gelatin may be replaced with colloidal albumin, casein, cellulose derivatives (e.g., carboxymethyl cellulose, hydroxyethyl cellulose), sugar derivatives (e.g., agar, sodium alginate, starch derivatives, dextran), synthetic hydrophilic colloids (e.g., polyvinyl alcohol, poly-N-vinylpyrrolidone, polyacrylic acid copolymers, polyacrylamide or derivatives thereof, partial hydrolysis products thereof), or gelatin derivatives.

The magnetic recording layer containing gelatin is preferably hardened with a hardening agent. Examples of suitable organic gelatin hardening agents include aldehyde compounds, e.g., formaldehyde and glutaraldehyde; ketone compounds, e.g., diacetyl and cyclopentanedione); bis(2-chloroethylurea), 2-hydroxy-4,6-dichloro-1,3,5-triazine; reactive halogen compounds described in U.S. Pat. Nos. 3,288,775 and 2,732,303 and British Patents 974,723 and 1,167,207; divinylsulfone, 5-acetyl-1,3-diacryloylhexahydro-1,3,5-triazine; reactive olefin compounds described in U.S. Pat. Nos. 3,635,718 and 3,232,763 and British Patent 994,869; N-hydroxymethylphthalimide; N-methylol compounds described in U.S. Pat. Nos. 2,732,316 and 2,586,168; isocyanate compounds described in U.S. Pat. No. 3,103,437; aziridine compounds described in U.S. Pat. Nos. 3,017,280 and 2,983,611; acid derivatives described in U.S. Pat. Nos. 2,725,294 and 2,725,295; epoxy compounds described in U.S. Pat. No. 3,091,537; and halogencarboxyaldehyde compounds, e.g., mucochloric acid. Examples of suitable inorganic hardening agents include chromium alum, zirconium sulfate, and carboxyl-activated hardening agents described in JP-B-56-12853, JP-B-58-32699, Belgian Patent 825,726, JP-A-60-225148, JP-A-51-126125, JP-B-58-50699, JP-A-54-54427, and U.S. Pat. No. 3,321,313.

The hardening agent is usually used in an amount of from 0.01 to 30% by weight, and preferably from 0.05 to 20% by weight, based on dry gelatin.

Acid-, alkali-, or bio-degradable binders which can be used in the magnetic recording layer are described below.

Acid- or alkali-degradable binders means those which are greatly solubilized when treated under acidic or alkaline conditions (usually in an aqueous solution or a water-miscible organic solvent) for a long time (usually 1 hour or more) and then released from the support; and those which chemically decompose under an acidic or alkaline condition and are released from the support. Such acid- or alkali-degradable binders preferably include cellulose derivatives (e.g., monoacetylcellulose, diacetylcellulose, propionylcellulose, hydroxyethyl cellulose, methyl cellulose), poly(meth)acrylates (e.g., polymers of (meth)acrylic esters with a hydroxyalkyl group (e.g., hydroxyethyl), a hydroxyaryl group (e.g., hydroxyethylphenyl), a carboxyalkyl group (e.g., carboxyethyl), a carboxyaryl group (e.g., carboxyphenyl), an aminoalkyl group (e.g., aminoethyl), or an aminoaryl group (e.g., aminoethylphenyl)), and poly(meth)acrylamides (e.g., poly(N,N-hydroxyethylacrylamide)).

Biodegradable binders preferably include poly(β-hydroxyalkanoate), polycaprolactone, starch, and starch-containing polymers (e.g., starch-containing polyethylene, starch-containing polypropylene). Polymers mainly comprising poly(3-hydroxyvalerate), poly(3-hydroxybutyrate) or poly(4-hydroxybutyrate), starch-containing polyethylene, and starch-containing polypropylene are more preferred. Details of these biodegradable binders are dislosed in *SEIBUNKAISEI PLASTICS-KAIGAI DOKO CHOSA HOKOKUSHO*, Bioindustry Kyokai (June, 1989).

When a magnetic layer (or a binder layer which may be provided nearer to a support than the magnetic layer) comprising the above-described acid- or alkali-degradable binder or biodegradable binder is removed from photographic materials to recover the support, the photographic materials are preferably cut to fine pieces in order to help solubilization or decomposition of the binder. Appropriate heating or agitation of a degradation bath or blowing of air through the bath is also recommended. Solvents to be used in a degradation bath, which is generally employed for treatment of acid-, alkali- or biodegradable binder-containing photographic materials, are not particularly limited and preferably include water, alcohols (e.g., methanol, ethanol, propanol), ketones (e.g., acetone, methyl ethyl ketone, acetophenone), and mixtures thereof.

Acids or alkalies which can be used for degradation of acid- or alkali-degradable binders preferably include hydrochloric acid, sulfuric acid, phosphoric acid, acetic acid, sodium hydroxide, potassium hydroxide, lithium hydroxide, calcium hydroxide, and ammonia, with hydrochloric acid, sulfuric acid, sodium hydroxide, and potassium hydroxide being particularly preferred.

Degradation treatment of photographic materials using biodegradable binders can be carried out as follows. Collected photographic materials are cut to fine pieces. Those containing gelatin emulsion layers are first treated with a gelatin decomposing enzyme, e.g., amylase, to remove the gelatin emulsion layers. The photographic materials are then treated in active sludge to remove the magnetic recording layer. The active sludge to be used is not particularly limited. For example, the standard active sludge of Chemical Inspection & Testing Institute, Chemicals Safty Center (CBC).

Biodegradation can be accelerated by blowing air into the sludge while keeping the temperature at 20° to 35° C. The longer the degradation time, the better. Taking recovery efficiency into consideration, a suitable degradation time is from a half day up to 20 days, and preferably from 1 to 7 days.

The magnetic layer (or a binder layer which may be provided nearer to a support than the magnetic layer) may contain a crosslinking agent, such as an epoxy type, isocyanate type or silane coupling type crosslinking agent.

The magnetic recording layer has a thickness of from 0.1 to 10 μm, preferably from 0.2 to 5 μm, and more preferably from 0.5 to 3 μm.

The magnetic recording layer is preferably formed on the back side of a light-sensitive material. The magnetic recording layer is formed on the back side of a transparent support over the entire surface thereof or in stripes by coating or printing techniques. It is also preferable that a polymer solution having dispersed therein magnetic powders and a polymer solution for forming a transparent support may be co-cast to obtain a transparent support having stripes of a magnetic recording layer. In this case, the two polymers preferably have substantially the same composition.

The details of a recording layer formed in stripes are described in JP-A-55-151639, JP-B-55-31455, and JP-B-29-4221.

Coating a magnetic recording layer in stripes can be performed by air doctor coating, blade coating, air knife coating, squeeze coating, impregnation, reverse-roll coating, transfer roll coating, gravure coating, kiss-roll coating, casting, spray coating, and the like. Details of these coating techniques can be found in *COATING KOGAKU*, pp. 253–277, Asakura Shoten (1971).

The thus formed magnetic layer is immediately subjected to an orientation treatment while, if desired, drying and then dried at 20° to 120° C. usually at a traveling speed of from 10 m/min to 500 m/min. If desired, the magnetic layer is further subjected to a surface smoothing treatment. These processing steps are described in detail in JP-B-40-23625, JP-B-39-28368, and U.S. Pat. No. 3,473,960. In particular, the process disclosed in JP-B-41-13181 appears to be a fundamental and important technique in the art.

A magnetic recording layer may also be formed in stripes by vacuum deposition using a ferromagnetic iron source. In this case, non-deposited portions are secured by any means. For example, the portions are masked by taping, or windows are attached to the vacuum evaporation apparatus. Details of these techniques are disclosed in JP-A-56-139095, JP-A-56-181479, and JP-A-60-157717.

The magnetic recording layer in stripes is preferably formed in an area other than the image-forming area of a photographic film, for example, in the upper or lower band of the film. The magnetic recording layer may be in a single stripe or two or more stripes. In the latter case, one of the stripes may contain a large amount of a magnetic powder and be opaque, with the other containing a small amount of a magnetic powder. The magnetic stripe(s) may be formed on both upper and lower bands of the film. In this case, either of the upper stripe(s) and the lower stripe(s) may be opaque, with the other being transparent. A transparent magnetic recording layer is advantageous in that an optical recording can be made without impairing the conventional optical system. No problem occurs with transparent stripes.

Where a magnetic recording layer is formed in stripes, the non-magnetic area also forms stripes having a different level from the magnetic layer, leading to various unfavorable problems. For example, adhesion of the magnetic stripes is deteriorated during long-term preservation under high temperature and high humidity conditions; a light-sensitive area in the vicinities of the magnetic stripes undergoes pressure fog; or the magnetic powder in the edges of the magnetic stripes falls off.

One approach to these problems is to level the non-magnetic area to the magnetic stripes by forming a non-magnetic layer on the non-magnetic area having the same thickness as the magnetic stripes.

Such a non-magnetic layer can be applied by any method. For example, a non-magnetic layer may be separately formed after a magnetic recording layer is formed in stripes by coating, printing, vacuum deposition, or transfer. The magnetic recording layer and the non-magnetic layer may be simultaneously coated. For example, a magnetic coating and a non-magnetic coating can be alternately extruded on the same plane by means of a compartmented Gießer (die). Similarly, in using a gravure coater, each coating can be alternately coated on the same plane. Further, each coating may be separately extruded on different planes to form stripes thereby making the magnetic layer and the non-magnetic layer on the same level.

The magnetic recording layer may have the combined functions of improving lubricating properties, curling control, static charge prevention, anti-blocking properties, and the like, or these functions may be attained by separately forming functional layers. If desired, a protective layer may be provided on the magnetic recording layer to improve scratch resistance.

The magnetic recording layer formed on the back side of a transparent support can be calendered to have improved surface smoothness and therefore an increased S/N ratio of magnetic signals. In this case, calendering preferably precedes coating of the light-sensitive layers on the transparent support.

If desired, before coating light-sensitive layers on the support, the support having the magnetic recording layer is subjected to a surface treatment for improving adhesion, or a subbing layer is coated thereon to improve adhesion to photographic layers such as a light-sensitive layer, or a backing layer is coated thereon in the same manner as for ordinary photographic materials. Then, light-sensitive layers are coated on the support, preferably on the side opposite to the magnetic recording layer, in the same manner as for ordinary photographic materials.

The thus produced photographic material having a magnetic recording layer is preferably used as a roll film which easily allows input of signals into the transparent magnetic recording layer while in a camera or on a printing line. The roll film preferably has an image area of from 350 to 1200 mm$^2$ per frame and a space capable of magnetic recording at least 15% of the image area per frame. More specifically, the number of perforations per frame is preferably made smaller than that of 135 format, and more preferably 4 or less perforations per frame.

It is possible to record optical information on the space capable of magnetic recording by means of a light emitter, e.g., LED. It is preferable to record both magnetic information and optical information on the same space. The magnetic recording format disclosed in WO 90/04205 is preferably followed.

Development processing the above-described photographic materials having a magnetic recording layer can be carried out in the same manner as previously described.

The present invention is now illustrated in greater detail with reference to Examples, but it should be understood that the present invention is not deemed to be limited thereto. All the percents and parts are by weight unless otherwise indicated.

EXAMPLE 1

1) Preparation of Support:

Dimethyl terephthalate (TPA), dimethyl 5-sodium sulfoisophthalate (SSIA), dimethyl adipate, and ethylene glycol were mixed at such a ratio that the resulting copolyester had the copolymerization composition shown in Table 1 below, and calcium acetate and antimony trioxide were added thereto to conduct interesterification in a usual manner. To the resulting product was added trimethyl phosphate, followed by gradually raising the temperature and gradually diminishing the pressure to a final temperature of 280° C. and a final pressure of 1 mm Hg or less to conduct copolymerization. The resulting copolyesters were designated A to E.

TABLE 1

| Polyester | Composition (by mol) | | | | Water Content (%) | Tg (°C.) |
|---|---|---|---|---|---|---|
| | TPA | SSIA | AA | EG | | |
| A | 100 | 1.5 | 15.7 | 117.2 | 0.28 | 57 |
| B | 100 | 1.5 | 12.8 | 114.3 | 0.30 | 61 |
| C | 100 | 5.7 | 12.8 | 118.5 | 0.47 | 61 |
| D | 100 | 5.1 | 8.0 | 113.1 | 0.47 | 67 |
| E (PET) | 100 | 0 | 0 | 100 | 0.20 | 77 |

TPA: Terephthalic acid
SSIA: 5-Sodium sulfoisophthalic acid
AA: Adipic acid
EG: Ethylene glycol Each of polyesters A to E was dried and melt-extruded in a usual manner. The casting conditions were optimized, and the heat set temperature was controlled as shown in Table 2 below to obtain a 75 μm thick biaxially stretched film having specific physical properties as shown in Table 2.

TABLE 2

| Sample No. | Polyester | Heat Set Temp. (°C.) | Water Content (%) | Tg (°C.) | Degree of Crystllinity (%) | Remarks |
|---|---|---|---|---|---|---|
| 1 | A | 180 | 0.28 | 57 | 28 | Comparison |
| 2 | A | 200 | 0.28 | 57 | 32 | Invention |
| 3 | B | 180 | 0.30 | 61 | 28 | Comparison |
| 4 | C | 180 | 0.47 | 61 | 25 | " |
| 5 | C | 200 | 0.47 | 61 | 29 | Invention |
| 6 | D | 180 | 0.47 | 67 | 24 | Comparison |
| 7 | E | 180 | 0.20 | 77 | 43 | " |

2) Coating of Subbing Layer:

After both sides of support Sample Nos. 1 to 7 were subjected to a corona discharge treatment at 0.02 kVA·min/m², a subbing layer having the following composition was coated thereon.

| Subbing Layer Composition: | |
|---|---|
| Gelatin | 3 g |
| Distilled water | 250 cc |
| Sodium α-sulfodi-2-ethylhexylsuccinate | 0.05 g |
| Formaldehyde | 0.02 g |

3) Coating of Backing Layer (Static Charge Preventing Layer):

In 3000 parts of ethanol were dissolved 230 parts of stannic chloride hydrate and 23 parts of antimony trichloride to form a uniform solution. To the solution was added dropwise a 1N sodium hydroxide aqueous solution to adjust to pH 3 to obtain a co-precipitate of colloidal stannic oxide and antimony oxide. The co-precipitate was allowed to stand at 50° C. for 24 hours to obtain a reddish brown colloidal precipitate.

The reddish brown colloidal precipitate was separated by centrifugation. Water was added to the precipitate, followed by centrifugation to remove excess ions. This washing operation was repeated three times to remove excess ions.

In 1500 parts of water was re-dispersed 200 parts of the resulting colloidal precipitate. The dispersion was heated to 600° C. and atomized in a baking furnace to obtain bluish fine particles of tin oxide-antimony oxide complex having an average particle size of 0.2 μm. The particles had a specific resistance of 25 Ω·cm.

A mixture of 40 parts of the resulting fine particles and 60 parts of water was adjusted to pH 7.0, roughly dispersed in a stirrer, and finely dispersed in a horizontal sand mill ("Dynomill" manufactured by Willy A. Backofen A. G.) for a retention time of 30 minutes to prepare a conductive particle dispersion.

A coating having the following formulation (A) was coated on one side of the support to a dry thickness of 0.3 μm and dried at 130° C. for 30 seconds.

| Formulation (A): | |
|---|---|
| Conductive particle dispersion | 10 parts |
| Gelatin | 1 part |
| Water | 27 parts |
| Methanol | 60 parts |
| Resorcin | 2 parts |
| Polyoxyethylene nonylphenyl ether | 0.01 part |

Then, a coating having the following formulation (B) was further coated thereon to a dry thickness of 0.1 μm and dried at 130° C. for 2 minutes.

| Formulation (B): | |
|---|---|
| Cellulose triacetate | 1 part |
| Acetone | 70 parts |
| Methanol | 15 parts |
| Dichloromethylene | 10 parts |
| p-Chlorophenol | 4 parts |

4) Coating of Magnetic Recording Layer:

A magnetic coating having the following formulation was coated on the static charge preventing layer by means of a gravure coater to a thickness of 1.0 μm and dried at 90° C. for 10 minutes to form a magnetic recording layer.

| Magnetic Coating Formulation: | |
|---|---|
| Co-Doped iron oxide fine powder: | |
| specific surface area: 45 m²/g | 1 part |
| specific surface area: 80 m²/g | 1 part |
| Barium ferrite fine powder | |
| specific surface area: 15 m²/g | 2 parts |
| specific surface area: 40 m²/g | 2 parts |
| Butyl acetate-vinyl chloride copolymer (1:1 by mol) | 20 parts |
| Polyurethane resin | 10 parts |
| Toluene diisocyanate | 40 parts |
| Butyl acetate | 100 parts |
| Methyl ethyl ketone | 50 parts |

5) Coating of Slip Layer:

A slip layer having the following composition was coated on the magnetic recording layer.

Slip Layer Composition:

| | |
|---|---|
| Diacetyl cellulose | 0.2 g/m² |
| Colloidal silica (Aerosil) | 0.02 g/m² |
| C$_{15}$H$_{31}$COOC$_{40}$H$_{81}$ | 0.02 g/m² |
| C$_{21}$H$_{43}$COO(CH$_2$CH$_2$O)$_3$COC$_9$F$_{19}$ | 0.01 g/m² |
| Poly(vinylidene difluoride/vinylidene tetrafluoride) (9:1 by mol) | 0.01 g/m² |
| Poly(methyl methacrylate/divinyl-benzene) (9:1 by mol; average particle size: 1.0 μm) | 0.03 g/m² |
| Silica (average particle size: 1.0 μm) | 0.005 g/m² |

The resulting base had a coercive force of 1000 Oe and a squareness ratio of from 0.6 to 0.7, proving capable of magnetic recording according to the signal input system disclosed in WO 90-04205.

6) Coating of Light-Sensitive Layers:

Light-sensitive layers were coated on the support on the side opposite to the magnetic recording layer in the same manner as described in Example 1 of JP-A-2-93641 to prepare a multi-layer color light-sensitive material.

7) Sample Processing:

The resulting sample was cut to a width of 35 mm and to a length for 36 exposures and put in a cartridge shown in FIG. 1. The roll film in the cartridge was preserved at 40° C. for 10 days to accelerate curling.

8) Development Processing:

The curled sample was processed according to the following schedule.

| Processing Step | Temperature (°C.) | Time (min) |
|---|---|---|
| Color development | 38 | 3 |
| Stopping | 38 | 1 |
| Washing | 38 | 1 |
| Bleaching | 38 | 2 |
| Washing | 38 | 1 |
| Fixing | 38 | 2 |
| Washing | 38 | 1 |
| Stabilization | 38 | 1 |

The composition of the processing solutions used are shown below.

Color Developer:

| | |
|---|---|
| Sodium hydroxide | 2 g |
| Sodium sulfite | 2 g |
| Potassium bromide | 0.4 g |
| Sodium chloride | 1 g |
| Borax | 4 g |
| Hydroxylamine sulfate | 2 g |
| Disodium ethylenediaminetetraacetate dihydrate | 2 g |
| 4-Amino-3-methyl-N-ethyl-N-(β-hydroxyethyl)-aniline monosulfate | 4 g |
| Water to make | 1 liter |

Stopping Bath:

| | |
|---|---|
| Sodium thiosulfate | 10 g |
| Ammonium thiosulfate (70% aqueous solution) | 30 ml |
| Acetic acid | 30 ml |
| Sodium acetate | 5 g |
| Potash alum | 15 g |
| Water to make | 1 liter |

Bleaching Bath:

| | |
|---|---|
| Sodium (ethylenediaminetetraacetato)-iron (III) dihydrate | 100 g |
| Potassium bromide | 50 g |
| Ammonium nitrate | 50 g |
| Boric acid | 5 g |
| Aqueous ammonia to adjust to pH 5.0 | |
| Water to make | 1 liter |

Fixing Bath:

| | |
|---|---|
| Sodium thiosulfate | 150 g |
| Sodium sulfite | 15 g |
| Borax | 12 g |
| Glacial acetic acid | 15 ml |
| Potash alum | 20 g |
| Water to make | 1 liter |

Stabilizing Bath:

| | |
|---|---|
| Boric acid | 5 g |
| Sodium citrate | 5 g |
| Sodium metaborate (tetrahydrate) | 3 g |
| Potash alum | 15 g |
| Water to make | 1 liter |

9) Evaluation of Photographic Material:

Transparency, tear strength, curling recovery, heat shrinkage, and thermal deformation of each sample determined according to the above-described methods. The results obtained are shown in Table 3 below.

All the symbols, A, B, C and D for evaluation of the photographic materials in the following Examples 1 to 8 mean as follows.

A: Excellent

B: Good

C: Practical but inferior to an existing level

D: Not practical

TABLE 3

| Support No. | Trans- par- ency | Tear Strength (g/mm) | Recovery from Curling | Percent Heat Shrinkage (%) | Thermal Defor- mation | Remark |
| --- | --- | --- | --- | --- | --- | --- |
| 1 | B | 860 | B | 1.5 | D | Comparison |
| 2 | B | 880 | B | 1.0 | B | Invention |
| 3 | B | 870 | D | 1.2 | B | Comparison |
| 4 | B | 770 | B | 1.8 | D | " |
| 5 | B | 790 | B | 1.0 | B | Invention |
| 6 | B | 740 | D | 1.2 | B | Comparison |
| 7 (PET) | B | 930 | D | 1.0 | B | " |
| TAC (80 μm) | B | 240 | B | 2.3 | C | " |

As can be seen from Tables 2 and 3, photographic materials having curling elimination properties and heat resistance can be obtained by using, as a support, a polyester film whose Tg, water content and degree of crystallinity fall within the respective specific range while retaining transparency and strength as required for a photographic support.

That is, the present invention provides a photographic support having improvements over TAC film having inferior strength and over PET film having poor recovery from curling.

The present invention when applied to conventional photographic systems brings about an increase in film strength and a reduction in production cost. The photographic materials according to the present invention are particularly effective when applied to new photographic systems where higher performances are demanded.

EXAMPLE 2

1) Preparation of Support:

Copolyesters A to E were prepared in the same manner as in Example 1-(1).

Each of polyesters A to E was melt-extruded in a usual manner. The casting conditions were optimized, and the heat set temperature was controlled as shown in Table 4 below to obtain a 80 μm thick biaxially stretched film (designated 1-1 to 1-9) having the specific physical properties shown in Table 4.

Layer):

A fine powder of stannic oxide-antimony oxide complex was prepared in the same manner as in Example 1-(3), except that the baking furnace for atomizing the colloidal precipitate dispersion was heated to 500° C. and that the resulting fine powder has an average particle size of 0.15 μm. The particles had a specific resistance of 25 Ω·cm.

A mixture of 40 parts of the resulting fine particles and 60 parts of water was adjusted to pH 7.0, roughly dispersed in a stirrer, and finely dispersed in a horizontal sand mill ("Dynomill" manufactured by Willy A. Backofen A. G.) for a retention time of 30 minutes to prepare a conductive particle dispersion.

A coating having the same formulation (A) as used in Example 1-(3), except for using the above-prepared conductive fine particle dispersion ($SnO_2$/Sb, 0.15 μm), was coated on one side of the support to a dry thickness of 0.3 μm and dried at 130° C. for 30 seconds.

Then, a coating having the same formulation (B) as used in Example 1-(3) was further coated thereon to a dry thickness of 0.1 μm and dried at 130° C. for 2 minutes.

4) Coating of Magnetic Recording Layer:

A magnetic coating having the following formulation was coated on the static charge preventing layer by means of a gravure coater to a thickness of 1.0 μm and dried at 90° C. for 10 minutes to form a magnetic recording layer.

TABLE 4

| Support No. | Polyester | Heat Set Temperature (°C.) | Degree of Crystallinity (%) | Stiffness (g) | Thermal Resistance (%) | Trans- mission (%) | Remarks |
| --- | --- | --- | --- | --- | --- | --- | --- |
| 1-1 | A | 180 | 28 | 12 | 0.27 | 78 | Comparison |
| 1-2 | A | 150 | 25 | 11 | 0.26 | 75 | " |
| 1-3 | A | 210 | 36 | 15 | 0.22 | 82 | Invention |
| 1-4 | B | 180 | 28 | 10 | 0.26 | 77 | Comparison |
| 1-5 | B | 220 | 34 | 15 | 0.20 | 83 | Invention |
| 1-6 | C | 160 | 23 | 10 | 0.28 | 80 | Comparison |
| 1-7 | C | 220 | 35 | 16 | 0.21 | 82 | Invention |
| 1-8 | D | 170 | 24 | 12 | 0.25 | 83 | Comparison |
| 1-9 | E | 180 | 40 | 10 | 0.18 | 83 | " |

2) Coating of Subbing Layer:

After both sides of support samples 1-1 to 1-9 were subjected to a corona discharge treatment at 0.02 kVA·min/m$^2$, a subbing layer having the same composition as in Example 1-(2) was coated thereon.

3) Coating of Backing Layer (Static Charge Preventing

| Magnetic Coating Formulation: | |
|---|---|
| Co-Doped iron oxide fine powder | |
| specific surface area: 45 m²/g | 1 part |
| specific surface area: 80 m²/g | 1 part |
| Barium ferrite fine powder | |
| specific surface area: 15 m²/g | 2 parts |
| specific surface area: 40 m²/g | 2 parts |
| Butyl acetate-vinyl chloride copolymer (1:1 by mol) | 20 parts |
| Polyurethane resin | 10 parts |
| Toluene diisocyanate | 40 parts |
| Butyl acetate | 100 parts |
| Methyl ethyl ketone | 50 parts |
| Triacetyl cellulose | 2 parts |

5) Coating of Slip Layer:

A slip layer having the same composition as used in Example 1-5) was coated on the magnetic recording layer.

The resulting base had a coercive force of 900 to 1000 Oe and a squareness ratio of from 0.6 to 0.7, and was capable of magnetic recording according to the signal input system disclosed in WO 90/04205.

6) Coating of Light-Sensitive Layers:

Light-sensitive layers were coated on the support on the side opposite to the magnetic recording layer in the same manner as described in Example 1 of JP-A-2-93641 to prepare a multi-layer color negative light-sensitive material. The layer structure of the resulting multi-layer material comprised a support, an antihalation layer as the 1st layer, an intermediate layer as the 2nd layer, light-sensitive layers as the 3rd to 13th layers, and protective layers as 14th and 15th layers in the order listed. The resulting samples were designated 1-1s to 1-9s. Sample 1-10s was prepared in the same manner but using a TAC film as a support.

7) Sample Processing:

The resulting light-sensitive material was cut to a width of 35 mm and to a length of 1.5 m and put in a cartridge of the type shown in FIG. 1.

8) Development Processing:

The photographic film was processed by means of a processing machine for motion picture film "FNCP-900" manufactured by Fuji Photo Film Co., Ltd. according to the following schedule.

| Processing Step | Time (min/sec) | Temp. (°C.) | Rate of Replenishment (ml/350 cm²) | Tank Volume (l) |
|---|---|---|---|---|
| Color development | 3/15 | 38 | 15 | 20 |
| Bleaching | 6/30 | 38 | 10 | 40 |
| Washing | 2/10 | 35 | 10 | 20 |
| Fixing | 4/20 | 38 | 20 | 30 |
| Washing (1) | 1/05 | 35 | counter-flow system of from (2) to (1) | 10 |
| Washing (2) | 1/00 | 35 | 20 | 10 |
| Stabilization | 1/05 | 38 | 10 | 10 |
| Drying | 4/20 | 55 | | |

Composition of the processing solutions used are shown below.

| | Running solution (g) | Replenisher (g) |
|---|---|---|
| Color Developer: | | |
| Diethylenetriaminepentaacetic acid | 1.0 | 1.1 |
| 1-Hydroxyethylidene-1,1-diphosphonic acid | 3.0 | 3.2 |
| Sodium sulfite | 4.0 | 4.9 |
| Potassium carbonate | 30.0 | 30.0 |
| Potassium bromide | 1.4 | — |
| Potassium iodide | 1.5 mg | — |
| Hydroxylamine sulfate | 2.4 | 3.6 |
| 4-(N-Ethyl-N-β-hydroxyethyl)amino)-2-methylaniline sulfate | 4.5 | 7.2 |
| Water to make | 1.0 l | 1.0 l |
| pH | 10.05 | 10.10 |
| Bleaching Bath: | | |
| Ammonium (ethylenediaminetetra-acetato)ferrite trihydrate | 100.0 | 140.0 |
| Disodium ethylenediaminetetraacetate | 10.0 | 11.0 |
| Ammonium bromide | 140.0 | 180.0 |
| Ammonium nitrate | 30.0 | 40.0 |
| Aqueous ammonia (27%) | 6.5 ml | 2.5 ml |
| Water to make | 1.0 l | 1.0 l |
| pH | 6.0 | 5.5 |
| Fixing Bath: | | |
| Disodium ethylenediaminetetraacetate | 0.5 | 1.0 |
| Sodium sulfite | 7.0 | 12.0 |
| Sodium bisulfite | 5.0 | 9.5 |
| Ammonium thiosulfate (70% aqueous solution) | 170.0 ml | 240.0 ml |
| Water to make | 1.0 l | 1.0 l |
| pH | 6.7 | 6.6 |

Washing Solution:

Tap water was passed through a mixed bed column packed with an H type strongly acidic cation exchange resin ("Amberlite IR-120B" produce by Rohm & Haas Co.) and an OH type anion exchange resin ("Amberlite IR-400" produced by Rohm& Haas Co.) to reduce calcium and magnesium ions each to 3 mg/l or less. To the water were added 20 mg/l of sodium isocyanurate dichloride and 1.5 g/l of sodium sulfate. The resulting liquid had a pH between 6.5 and 7.5.

| | Running Solution (g) | Replenisher (g) |
|---|---|---|
| Stabilizing Bath: | | |
| Formalin (37%) | 2.0 ml | 3.0 ml |
| Polyoxyethylene p-mononoylphenyl ether (average degree of polymerization: 10) | 0.3 | 0.45 |
| Disodium ethylenediaminetetraacetate | 0.05 | 0.08 |
| Water to make | 1.0 l | 1.0 l |
| pH | 5.0–8.0 | 5.0–8.0 |

9) Evaluation of Photographic Material:

The photographic materials were evaluated according to the above-described methods. The results obtained are shown in Table 5 below.

TABLE 5

| Sample No. | Support | Trans- par- ency | Tear Strength (g) | Recovery from Curling | Liabil- ility to Curling | Torque for Film Feed (g) | Jamming in Printer (times) | Number of Magnetic Output Errors | Remark |
| --- | --- | --- | --- | --- | --- | --- | --- | --- | --- |
| 1-1s | 1-1 | B | 860 | B | B | 210 | 21 | 7 | Comparison |
| 1-2s | 1-2 | D | 840 | B | D | 450 | 3 | 12 | " |
| 1-3s | 1-3 | B | 830 | B | B | 190 | 2 | 3 | Invention |
| 1-4s | 1-4 | D | 790 | D | D | 350 | 15 | 36 | Comparison |
| 1-5s | 1-5 | B | 810 | B | B | 200 | 4 | 4 | Invention |
| 1-6s | 1-6 | B | 750 | B | D | 380 | 10 | 9 | Comparison |
| 1-7s | 1-7 | B | 790 | B | B | 180 | 2 | 2 | Invention |
| 1-8s | 1-8 | B | 820 | B | D | 430 | 19 | 10 | Comparison |
| 1-9s | 1-9 | B | 800 | D | D | 650 | 26 | 28 | " |
| 1-10s | TAC | B | 240 | B | D | 370 | 16 | 11 | Comparison |

As is proved in Tables 4 and 5, the photographic materials according to the present invention satisfy all the testing items of transparency, tear strength, recover from curling, liability to curling, easy film feed (torque), easy pass in printer (freedom from jamming), and magnetic output error. In particular, Samples 1-3s, 1-5s, and 1-7s formed excellent images.

To the contrary, the comparative samples using a polyester support out of the scope of the present invention cannot satisfy all of the above-described performance properties.

EXAMPLE 3

Color reversal films (Samples 2-1a to 2-10a) were prepared in the same manner as in Example 2, except that the light-sensitive layers (3rd to 13th layers) and the protective layers (14th and 15th layers) were replaced with those of Sample 101 (Example 1) of JP-A-2-854 (color reversal film), and evaluated in the same manner as in Example 2.

As a result, samples 2-3s, 2-5s, and 2-7s according to the present invention exhibited excellent transparency, high tear strength, high recovery from curling, low liability to curling, easy film feed, easy pass in printer, and reduced magnetic output error. To the contrary, comparative samples 2-1s, 2-2s, 2-4s, 2-6s, 2-8s, and 2-9s did not satisfy all of these performance properties.

Accordingly, the photographic materials using a polyester film satisfying the following characteristics as a support exhibit excellent curling elimination properties after development processing as well as reduced liability to curling in cartridges while retaining excellent heat resistance and transparency.

$$Tg \leq 32.1A^2 + 55$$

$$X \geq -0.74Tg + 71.7$$

$$S \geq 13$$

$$T \leq 0.25$$

$$K \geq 80$$

wherein all the symbols are as defined above.

EXAMPLE 4

1) Preparation of Support:

To a mixture of 120 parts of dimethyl terephthalate, 46 parts of ethylene glycol, 20 parts of dimethyl 5-sodium sulfoisophthalate, and 14 parts of dimethyl adipate were added 0.1 part of calcium acetate and 0.03 part of antimony trioxide, and an interesterification reaction was conducted in a usual manner. To the resulting product was added 0.05 part of trimethyl phosphate, followed by gradually raising the temperature and gradually diminishing the pressure to a final temperature of 280° C. and a final pressure of 1 mm Hg or less to conduct copolymerization to prepare a copolyester (referred to as a water-absorbing polymer in Examples 4 to 6).

Fifty parts of the resulting copolyester and 50 parts of PET were mixed and dried in a usual manner. The mixture was melt-extruded at 280° C. to prepare an unstretched sheet. The unstretched sheet was stretched at 90° C. at a stretch ratio of 3.5 in a longitudinal direction and at 95° C. at a stretch ratio of 3.7 in a width direction, followed by heat setting at 200° C. for 5 seconds to obtain a 75 μm thick biaxially stretched film according to the present invention. The film had satisfactory transparency and mechanical characteristics, having a haze of 1.2%, a tear strength of 16 kg/mm², and an initial modulus of elasticity of 400 kg/mm.

For comparison, a sheet solely comprising the above-prepared water-absorbing polymer was dried, extruded, and biaxially stretched under the same conditions as described above to obtain a 75 μm thick film.

2) Evaluation of Support:

Each of the above-prepared film comprising the water-absorbing polymer and PET (thickness: 75 μm) and comparative film solely comprising the water-absorbing polymer (thickness: 75 μm) and, in addition, a commercially available PET film (thickness: 75 μm) and a commercially available TAC film (thickness: 80 μm) was evaluated in terms of water content, recovery from curling, and heat resistance (percent heat shrinkage and thermal deformation). In this example, the water content of each sample was measured according to the following test method. The results obtained are shown in Table 6.

Water Content Measurement:

The sample was conditioned at 23° C. and 30% RH for 3 hours and dipped in distilled water at 23° C. for 15 minutes. Then, the water content was measured at 150° C. with a moisture meter "CA-02" manufactured by Mitsubishi Kasei Corporation.

TABLE 6

| Sample | Water Content (%) | Curling Recovery (%) | Heat Shrinkage (150° C. × 30 min) (%) | Thermal Deformation (80° C. × 7 hrs) |
|---|---|---|---|---|
| TAC (80 μm) | 4.5 | 95 | 2.1 | C |
| PET (75 μm) | 0.3 | 15 | 0.9 | B |
| Water-absorbing polymer alone (75 μm) | 3.0 | 85 | 5.7 | D |
| Water-absorbing polymer + PET (75 μm) | 2.8 | 80 | 1.3 | B |

It can be seen from Table 6 that the polyester film having a water content of 2.8% by weight is excellent in recovery from curling. Further, the polyester film comprising a blend of a water-absorbing polymer and PET exhibits great improvements in both heat shrinkage and thermal deformation over the film solely comprising the water-absorbing polymer and also proved superior to a TAC film.

3) Preparation of Photographic Material:

A photographic material was prepared in the same manner as in Example 1, except for using each of the above-described supports. The resulting photographic material was cut to size, put in a cartridge, and preserved in the same manner as in Example 1.

4) Development Processing:

The curled photographic material was development-processed in the same manner as in Example 1.

5) Evaluation of Photographic Material:

Each of the developed samples was evaluated according to the following test methods. The results obtained are shown in Table 7 below.

5-1) Elimination of Curling (Curling Value):

A development-processed sample was conditioned at 20° C. and 60% RH for 3 days, and curling value (1/diameter of the innermost periphery of arc formed by curling) was measured.

5-2) Heat Shrinkage:

A development-processed sample was cut to a size of 35 mm×12 mm, conditioned at 25° C. and 60% RH for 24 hours, and heat-treated in air at 50° C. for 1 day in a thermostat. After re-conditioning at 25° C. and 60% RH for 24 hours, the length in the longitudinal direction was measured to obtain percent heat shrinkage.

5-3) Thermal Deformation:

A development-processed sample was cut to a size of 35 mm×12 mm and heat-treated in air at 80° C. for 7 hours in a thermostat. The surface unevenness of the film was observed visually.

Further, the mechanical strength of the samples before development processing was measured. The results obtained are also shown in Table 7.

TABLE 7

| Support | Curling Value | Heat Shrinkage (50° C. × 1 day) (%) | Thermal Deformation (80° C. × 7 hrs) | Mechanical Strength | | |
|---|---|---|---|---|---|---|
| | | | | Breaking Strength (kg/mm$^2$) | Initial Modulus of Elasticity (kg/mm$^2$) | Tear Strength (g/mm) |
| TAC (80 μm) | 0.2 | 2.3 | C | 13.1 | 395 | 240 |
| PET (75 μm) | 3.1 | 1.0 | B | 23 | 410 | 930 |
| Water-absorbing polymer alone (75 μm) | 0.5 | 6.0 | D | 15.8 | 400 | 760 |
| Water-absorbing polymer + PET (75 μm) | 0.7 | 1.5 | B | 16.5 | 405 | 870 |

It can be seen from Table 7 that the sample using the support made from a blend of PET and a water-absorbing polymer, a water-absorbing polymer alone, or TAC was substantially free from residual curling after development processing, whereas the sample using a PET film support retained the curling.

Further, the sample using the support made of a water-absorbing polymer alone underwent significant heat shrinkage and thermal deformation. To the contrary, the sample using the support made of a blend of PET and a water-absorbing polymer, though still inferior to the PET film, exhibited superiority to the TAC film in heat resistance.

In addition, the sample using the support made of a blend of a water-absorbing polymer and PET had high mechanical strength approximate to the PET film and over the TAC film.

It has thus been proved that use of a support comprising a blend of PET and a water-absorbing polymer provides a photographic material having curling elimination properties equal to TAC, high mechanical strength equal to PET, and satisfactory heat resistance.

EXAMPLE 5

1) Preparation of Support:

In an autoclave, 100 parts of terephthalic acid and 100 parts of ethylene glycol were charged, and a direct esterification reaction was conducted at 220° C. and 1.5 kg/cm². When the reaction rate exceeded 40%, a slurry of water-absorbing inorganic compounds having the following composition was added thereto.

| Inorganic Compound Slurry Composition: | |
|---|---|
| Water | 100 parts |
| Ethylene glycol | 160 parts |
| Calcium carbonate (average particle size: 0.12 μm; specific surface area: 14 m²/g) | 0.8 part |
| Silane coupling agent-treated silicon dioxide (average particle size: 0.1 μm; specific surface area: 40 m²/g) | 0.8 part |
| Talc (average particle size: 0.4 μm; specific surface area: 3 m²/g) | 0.8 part |
| Kaolin (average particle size: 0.6 μm; specific surface area: 1.6 m²/g) | 0.8 part |
| Alumina (average particle size: 0.08 μm; specific surface area: 30 m²/g) | 0.8 part |

To the reaction system 0.04 parts of magnesium acetate and 0.03 part of antimony trioxide were further added as a catalyst system, and a polymerization reaction was conducted in a usual manner to obtain PET containing an inorganic water-absorbing substance having an intrinsic viscosity of 0.60.

The water-absorbing substance-containing PET was dried, extruded, and biaxially stretched under the same conditions as in Example 1 to obtain a 75 μm thick film. The resulting film had satisfactory transparency and mechanical strength, and had a haze of 1.5%, a breaking strength of 27 kg/mm², and an initial modulus of elasticity of 430 kg/mm².

2) Evaluation of Support:

The resulting film and, for comparison, a PET film and a TAC film were evaluated in terms of recovery from curling, water content (the measuring method of Example 4 was followed), and heat resistance (the measuring method of Example 4 were followed). The resulting obtained are shown in Table 8.

TABLE 8

| Sample | Water Content (%) | Recovery from Curling (%) | Heat Shrinkage (%) | Thermal Deformation (80° C. × 7 hrs) |
|---|---|---|---|---|
| TAC (80 μm) | 4.5 | 95 | 2.1 | C |
| PET (75 μm) | 0.3 | 15 | 0.9 | B |
| Water-absorbing inorganic compound-containing PET (75 μm) | 2.0 | 75 | 0.5 | A |

As is apparent from Table 8, the PET film containing an inorganic water-absorbing compound has an increased water content and thus exhibits satisfactory recovery from curling. Further, it was superior to the PET film in heat resistance.

3) Preparation of Photographic Material:

A photographic material was prepared by using each of the above-described supports.

3-1) Coating of Subbing Layer and Static Charge Preventing Layer:

A subbing layer and a static charge preventing layer were formed on the support in the same manner as in Example 1.

3-2) Coating of Magnetic Recording Layer:

Dopes (1), (2), and (3) having the following compositions were coated in stripes on the static charge preventing layer to a thickness of 2 μm by using a compartmented die (gieβer). Dope (1) was to provide an optically transparent magnetic layer capable of magnetic recording and also capable of optical recording with, e.g., a bar coder. Dope (3) was to provide an opaque magnetic layer capable of high-density magnetic recording. Dope (2) comprised binders only and was to provide a completely transparent layer for making up the difference in level between the magnetic layer in stripes and the non-magnetic area. The gaps of the compartments of the die were set in such a manner that the non-magnetic layer of Dope (2) might agree with the area on which a photographic image is to be recorded.

| Dope (1) Composition: | |
|---|---|
| Co-Doped iron oxide fine powder (incorporated as a dispersion in gelatin; average particle size: 0.08 μm) | 2.5 g/m² |
| Gelatin | 3.0 g/m² |
| $(CH_2 = CHSO_2NHCH_2CH_2NH)_2 - CO$ | 0.1 g/m² |
| A-1 | 0.02 g/m² |

A-1 $C_8H_{17}$—⟨○⟩—$O+CH_2CH_2\}_3SO_3Na$

| | |
|---|---|
| Polyethyl acrylate (average particle size: 0.08 μm) | 1 g/m² |
| Dope (2) Composition: | |
| Gelatin | 3 g/m² |
| $(CH_2 = CHSO_2NHCH_2CH_2NH)_2 - CO$ | 0.1 g/m² |
| A-1 | 0.02 g/m² |
| Polyethyl acrylate (average particle size: 0.08 μm) | 1 g/m² |
| Dope (3) Composition: | |
| Co-Doped iron oxide fine powder (incorporated as a dispersion in gelatin; average particle size: 0.08 μm) | 0.2 g/m² |
| Gelatin | 3 g/m² |
| $(CH_2 = CHSO_2NHCH_2CH_2NH)_2 - CO$ | 0.1 g/m² |
| A-1 | 0.02 g/m² |
| Polyethyl acrylate (average particle size: 0.08 μm) | 1 g/m² |

3-3) Coating of Slip Layer:

A slip layer having the following composition was coated on the magnetic recording layer and non-magnetic binder layer formed in 3-2) above.

| Slip Layer Composition: | |
|---|---|
| Gelatin | 0.5 g/m² |
| Polymethyl methacrylate (average particle size: 1.5 μm) | 0.02 g/m² |
| Cetyl stearate* (dispersed using sodium dodecylbenzenesulfonate) | 0.01 g/m² |
| Sodium di(2-ethylhexyl)sulfosuccinate | 0.01 g/m² |
| $C_8F_{17}SO_2N(C_3H_7)CH_2COOK$ | 0.01 g/m² |

-continued

Slip Layer Composition:

*Cetyl stearate was pulverized in an oscillation ball mill (grinding medium: zirconia beads having a diameter of 1 mm) together with 3% by weight of sodium dodecylbenzenesulfonate based on the solid content, and then added to the coating composition. The resulting fine particles had an average diameter of 0.15 μm, and at least 90% by volume distribution of the fine particles had a diameter of not more than 0.3 μm.

The thus formed base had a coercive force of 950 to 100 Oe.

3-4) Coating of Light-Sensitive Layers:

On the side opposite to the magnetic recording layer the same reversal color emulsion layers as used in Sample 101 of Example 1 of JP-A-2-854 were coated to obtain a color reversal film.

4) Sample Processing:

The resulting photographic material was cut to a width of 35 mm and to a length for 36 exposures and put in a cartridge shown in FIG. 1. The roll film in the cartridge was preserved at 40° C. for 10 days to accelerate curling.

5) Development Processing:

The curled sample was processed according to the following schedule.

| Processing Step | Temperature (°C.) | Time (min) |
|---|---|---|
| First development | 38 | 6 |
| Washing | 38 | 2 |
| Reversing | 38 | 2 |
| Color development | 38 | 6 |
| Compensation | 38 | 2 |
| Bleaching | 38 | 6 |
| Fixing | 38 | 4 |
| Washing | 38 | 4 |
| Stabilization | 25 | 1 |

Compositions of the processing solutions used were as follows.

First Developer:

| | |
|---|---|
| Pentasodium nitrilo-N,N,N-trimethylenephosphonate | 2.0 g |
| Sodium sulfite | 30 g |
| Potassium hydroquinonemonosulfonate | 20 g |
| Potassium carbonate | 33 g |
| 1-Phenyl-4-methyl-4-hydroxymethyl-3-pyrazolidone | 2.0 g |
| Potassium bromide | 2.5 g |
| Potassium thiocyanate | 1.2 g |
| Potassium iodide | 2.0 mg |
| Water to make | 1000 ml |
| pH (adjusted with hydrochloric acid or potassium hydroxide) | 9.60 |

Reversing Bath:

| | |
|---|---|
| Pentasodium nitrilo-N,N,N-trimethylenephosphonate | 3.0 g |
| Stannous chloride dihydrate | 1.0 g |
| p-Aminophenol | 0.1 g |
| Sodium hydroxide | 8 g |
| Glacial acetic acid | 15 ml |
| Water to make | 1000 ml |
| pH (adjusted with hydrochloric acid or sodium hydroxide) | 6.00 |

Color Developer:

| | |
|---|---|
| Pentasodium nitrilo-N,N,N-trimethylenephosphonate | 2.0 g |
| Sodium sulfite | 7.0 g |
| Sodium tertiary phosphate dodecahydrate | 36 g |
| Potassium bromide | 1.0 g |
| Potassium iodide | 90 mg |
| Sodium hydroxide | 3.0 g |
| Citrazinic acid | 1.5 g |
| N-Ethyl-N-(β-methanesulfonamidoethyl)-3-methyl-4-aminoaniline sulfate | 11 g |
| 3,6-Dithiooctane-1,8-diol | 1.0 g |
| Water to make | 1000 ml |
| pH (adjusted with hydrochloric acid or potassium hydroxide) | 11.80 |

Compensating Solution:

| | |
|---|---|
| Disodium ethylenediaminetetraacetate dihydrate | 8.0 g |
| Sodium sulfite | 12 g |
| 1-Thioglycerin | 0.4 ml |
| Water to make | 1000 ml |
| pH (adjusted with hydrochloric acid or sodium hydroxide) | 6.20 |

Bleaching Bath:

| | |
|---|---|
| Disodium ethylenediaminetetraacetate dihydrate | 2.0 g |
| Ammonium (ethylenediaminetetraacetato)iron (III) dihydrate | 120 g |
| Potassium bromide | 100 g |
| Ammonium nitrate | 10 g |
| Water to make | 1000 ml |
| pH (adjusted with hydrochloric acid or sodium hydroxide) | 5.70 |

Fixing Bath:

| | |
|---|---|
| Sodium thiosulfate | 80 g |
| Sodium sulfite | 5.0 g |
| Sodium bisulfite | 5.0 g |
| Water to make | 1000 ml |
| pH (adjusted with hydrochloric acid or aqueous ammonia) | 6.60 |

Stabilizing Bath:

| | |
|---|---|
| Formalin (37%) | 5.0 ml |
| Polyoxyethylene p-monononylphenyl ether (average degree of polymerization: 10) | 0.5 ml |
| Water to make | 1000 ml |
| pH | not adjusted |

6) Evaluation of Photographic Material:

6-1) Curling Value:

Curling elimination properties of the photographic material was evaluated by determining curling value according to the following test method. The results obtained are shown in Table 9 below.

Curling Value:

A development-processed sample was conditioned at 25° C. and 60% RH for 3 days, and curling value (1/diameter of arc formed by curling) was measured.

6-2) Heat Resistance:

Heat shrinkage and thermal deformation of the development-processed sample were evaluated in the same manner as in Example 4. The results obtained are shown in Table 9.

6-3) Mechanical Strength:

Breaking strength, initial modulus of elasticity, and tear strength of the above-prepared photographic samples were measured. The results are shown in Table 9.

TABLE 9

| Support | Curling Value | Heat Shrinkage (%) | Thermal Deformation (80° C. × 7 hrs) | Mechanical Strength | | |
|---|---|---|---|---|---|---|
| | | | | Breaking Strength (kg/mm$^2$) | Initial Modulus of Elasticity (kg/mm$^2$) | Tear Strength (g/mm) |
| TAC (80 μm) | 0.3 | 2.2 | C | 13.1 | 395 | 240 |
| PET (75 μm) | 3.3 | 0.9 | B | 23 | 410 | 930 |
| Water-absorbing inorganic compound-containing PET (75 μm) | 0.9 | 0.7 | A | 25 | 430 | 950 |

It can be seen from Table 9 that the curling elimination properties during development processing of the sample according to the present invention, though not so high as the sample using a TAC film, showed considerable improvement over the sample using a PET film. The sample of the present invention also showed improvements in heat resistance over the sample using a PET film.

It is also seen that the sample of the present invention has improved mechanical strength over the sample using a PET film.

EXAMPLE 6

1) Preparation of Support:

A hydrophilic polymer containing an inorganic water-absorbing substance was prepared as follows.

To 46% of ethylene glycol were added the following inorganic water-absorbing substances, and the mixture was agitated in a homogenizer.

| | |
|---|---|
| Silicon dioxide (fatty acid-treated; average particle size: 0.10 μm; specific surface area: 20 m$^2$/g) | 1.0 part |
| Magnesium oxide (average particle size: 1.0 μm; specific surface area: 80 m$^2$/g) | 1.0 part |
| Magnesium hydroxide (average particle size: 1.3 μm; specific surface area: 10 m$^2$/g) | 1.0 part |
| Sodium chloride | 1.0 part |

Then, 120 parts of dimethyl terephthalate, 20 parts of dimethyl 5-sodium sulfoisophthalate, and 14 parts of dimethyl adipate were added thereto. To the mixture were further added 0.1 parts of calcium acetate and 0.03 parts of antimony trioxide to conduct an interesterification reaction in a usual manner. To the resulting product was added 0.05 parts of trimethyl phosphate, followed by gradually raising the temperature and gradually diminishing the pressure to a final temperature of 280° C. and a final pressure of 1 mm Hg or less to conduct copolymerization.

Fifty parts of the resulting copolyester and 50 parts of the inorganic water-absorbing substance-containing PET as prepared in the same manner as in Example 5 were mixed. The polymer blend was dried, extruded, and biaxially stretched in the same manner as in Example 4 to obtain a 75 μm thick biaxially stretched film.

The resulting film had satisfactory transparency and mechanical strength, and had a haze of 2.0%, a breaking strength of 26 kg/mm$^2$, and an initial modulus of elasticity of 450 kg/mm$^2$ 2) Evaluation of Support:

Each of the above-prepared film and, for comparison, a PET film, a TAC film, and the film comprising a water-absorbing polymer alone as prepared in Example 4 were evaluated in terms of recovery from curling, water content (measured according to the test method described in Example 4), and heat resistance (measured according to the test methods described in Example 4). The results obtained are shown in Table 10 below.

TABLE 10

| Sample | Water Content (%) | Recovery from Curling (%) | Heat Shrinkage (%) | Thermal Deformation (80° C. × 7 hrs) |
|---|---|---|---|---|
| TAC (80 μm) | 4.5 | 95 | 2.1 | C |
| PET (75 μm) | 0.3 | 15 | 0.9 | B |
| Water-absorbing polymer alone (75 μm) | 3.0 | 85 | 5.7 | D |
| Water-absorbing polymer + inorganic compound + PET (75 μm) | 3.2 | 91 | 0.9 | B |

As is apparent from Table 10, the film according to the present invention has a high water content and thus exhibits satisfactory recovery from curling. Further, it was superior to the film comprising a water-absorbing polymer alone and equal to the PET film in heat resistance characteristics.

3) Preparation of Photographic Material:

A photographic material was prepared in the same manner as in Example 1, except for using each of the above-described supports.

4) Sample Processing:

The resulting photographic material was cut to a width of 35 mm and to a length for 36 exposures and put in a cartridge of 135 format. The roll film in the cartridge was preserved at 50° C. for 5 days to accelerate curling.

5) Development Processing.

The thus curled photographic material was development-processed in the same manner as in Example 1.

6) Evaluation of Photographic Material:

Curl value after development processing was determined according to the test method described in Example 5.

Heat resistance (heat shrinkage and thermal deformation) of the photographic material after development processing was evaluated according to the test methods described in Example 4.

Further, mechanical strength characteristics of the photographic material before development processing were measured.

The results of these evaluations are shown in Table 11 below.

1-2) Preparation of Polyester having Tg≧63° C.:

A polyethylene terephthalate (PET) was prepared by direct polymerization of terephthalic acid and ethylene glycol. The resulting polymer had an intrinsic viscosity of 0.63.

1-3) Preparation of Laminate Film:

Each of the above-prepared polymer A and PET was dried in a usual manner and then co-extruded by means of a

TABLE 11

| Support | Curling Value | Heat Shrinkage (%) | Thermal Deformation (80° C. × 7 hrs) | Breaking Strength (kg/mm²) | Initial Modulus of Elasticity (kg/mm²) | Tear Strength (g/mm) |
|---|---|---|---|---|---|---|
| TAC (80 μm) | 0.2 | 2.3 | C | 13.0 | 390 | 230 |
| PET (75 μm) | 3.3 | 0.9 | B | 21 | 400 | 915 |
| Water-absorbing polymer alone (75 μm) | 0.5 | 6.3 | D | 15.3 | 395 | 740 |
| Water-absorbing polymer + inorganic compound + PET (75 μm) | 0.5 | 0.9 | B | 18.5 | 415 | 880 |

It can be seen from Table 11 that curling was substantially retained after development processing in using the PET film, whereas curling using the support according to the present invention was eliminated to substantially the same level as attained by the TAC film. The sample using the conventional support comprising a water-absorbing polymer alone had low heat resistance and high percent heat shrinkage. To the contrary, the sample of the present invention showed marked improvements in these properties, substantially becoming equal to the sample using the PET film. Further, the sample of the present invention had higher mechanical strength than the sample using the PET film.

As described above, use of a support comprising PET as a main component and a water-absorbing polymer or a water-absorbing inorganic substance provides a photographic material which exhibits curling elimination properties after development processing while retaining high mechanical strength and high heat resistance. The present invention has thus overcome the disadvantages associated with TAC films, i.e., high cost and poor mechnical strength in spite of the curling elimination properties. Accordingly, the photographic material according to the present invention is useful in fields where no film other than a TAC film could be used due to lack of curling elimination properties, such as color negative films and color reversal films, thereby making it possible to reduce cost and increase strength.

The photographic material according to the present invention manifests its superiority particularly when applied to the aforesaid new cartridge systems. That is, as compared with conventional photographic materials using a TAC film support, the photographic material of the invention exhibits greatly improved strength that is sufficient for use with the new cartridge system and, at the same time, has reduced thickness thereby making it possible to reduce the size of a cartridge.

EXAMPLE 7

1) Preparation of Support:
1-1) Synthesis of Water-Absorbing Polymer:

A water-absorbing copolymer polyethylene terephthalate was synthesized in the same manner as in Example 4. The resulting polymer was designated as polymer A.

co-extrusion die having three die lips. Polymer A was extruded at 280° C. from the upper and lower lips, with each gap being set so that the extruded film had a thickness of 300 μm. PET was extruded at 280° C. from the middle lip, with the gap being set so that the extruded film had a thickness of 600 μm.

Further, PET was coated at 280° C. on both sides of the laminate to a thickness of 10 μm by hot-melt extrusion coating.

The resulting laminate film was longitudinally stretched at 90° C. at a stretch ratio of 3.5 and transversely stretched at 95° C. at a stretch ratio of 3.7, followed by heat setting at 200° C. for 5 seconds.

The thus prepared support having a laminate structure had a total thickness of 94 μm. The total film thickness before biaxial stretching was 1220 μm, and the stretching reduced the thickness to about one-thirteenth. Accordingly, the resulting support had a 5-layered laminate structure composed of PET/polymer A/PET/polymer A/PET, each having a calculated thickness of 0.8 μm, 23.1 μm, 46.2 μm, 23.1 μm, and 0.8 μm, respectively.

2) Preparation of Comparative Support (Comparative Example 1):

A comparative support having a water-absorbing polymer layer 20 μm or more deep from the surface thereof was prepared in the same manner as described in 1-1) to 1-3) above, except that PET was extruded from each of the upper and lower lips (with its gap being set to provide a 300 μm thick film), and polymer A was extruded from the middle lip (with its gap being set to provide a 600 μm thick film).

The resulting support had 3-layered laminate structure having a total thickness of 94 μm, composed of PET (23.9 μm)/polymer A (46.2 μm)/PET (23.9 μm).

3) Preparation of Comparative Support (Comparative Example 2):

A comparative support having a water-absorbing polymer layer on one side thereof was prepared in the same manner as described in 1-1) to 1-3) above, except that polymer A was extruded from one of the upper and lower lips (with its gap being set to provide a 300 μm thick film) and PET was extruded from the middle lip (with its gap being set to provide a 600 μm thick film) and from the other of the upper and lower lips (with its gap being set to provide a 300 μm thick film).

The resulting support had a 3-layered laminate structure having a total thickness of 94 μm, composed of PET (0.8 μm)/polymer A (23.1 μm)/PET (70.1 μm).

4) Preparation of Comparative Support (Comparative Example 3):

Polymer A was dried in a usual manner and melt-extruded at 280° C. to obtain an unstretched film. The film was biaxially stretched and then subjected to heat set in the same manner as described in 1-3) above to obtain a 92 μm thick support.

5) Preparation of PET Support:

PET was dried in a usual manner and melt-extruded at 280° C. to obtain an unstretched film. The film was biaxially stretched and then subjected to heat set in the same manner as described in 1-3) above to obtain a 92 μm thick support.

6) Preparation of TAC Support:

A coating composition comprising 23 parts of cellulose triacetate, 2.3 parts of triphenyl phosphate, 1.3 part of biphenyldiphenyl phosphate, 65.7 parts of methylene chloride, 2.7 parts of methanol, and 4.8 parts of butanol was cast on a band carrier and dried to obtain a 92 μm thick TAC film.

7) Evaluation of Support:

Mechanical strength, transparency, recovery from curling, water content and heat shrinkage (according to the test method of Example 4) and thermal deformation (according to the test method described below) of each of the above prepared supports were measured. The results obtained are shown in Table 12.

Thermal Deformation:

A sample was cut to a 35 mm wide and 12 cm long specimen and wound around a core having a diameter of 25 mm, and the end of the roll was fixed with Mylar tape. The specimen in a roll form was heat-treated at 50° C. for 30 minutes. Surface unevenness was observed visually, and haze was measured according to ASTN-D1003-52.

absorbing polymer (polymer A) on only one side thereof and therefore has small curling elimination properties.

The film according to the present invention is improved in heat resistance to some extent approximately equal to the PET film, though the film comprising polymer A alone is inferior in heat resistance.

It was also demonstrated that the laminate film according to the present invention prevents bleeding of oligomers from the polymer A layer and retains its clearness because it has on both sides a PET layer of such a small thickness that it does not impair water absorption properties of the polymer A layer. To the contrary, the film solely comprising polymer A suffered from bleeding of oligomers which causes haze.

7) Preparation of Photographic Material:

A multi-layer color photographic material having a magnetic recording layer on the back side thereof was prepared by using each of the above-prepared supports in the same manner as described in Example 1.

8) Sample Processing:

The resulting photographic material was cut to size, put in a cartridge, and given a curl in the same manner as in Example 1.

9) Development Processing:

The photographic material was development-processed in the same manner as in Example 1.

10) Evaluation of Photographic Material:

Mechanical strength characteristics of the sample before development processing were measured. Curling value after development processing was measured according to the same test method as described in Example 5 (25° C.×60% RH×3 days). Thermal deformation of the developed sample was observed in the same manner as described above with respect to the evaluation of supports. The results of these measurements are shown in Table 13 below.

TABLE 12

| Support | Film Thickness (μm) | Haze (μm) | Tear Strength (%) | Initial Modulus of Elasticity (kg/mm$^2$) | Curling Recovery (kg/mm$^2$) | Water Content (%) | Heat Shrinkage (150° C. × 30 min) (%) | Thermal Deformation (%) | Haze After Heat Treatment (%) |
|---|---|---|---|---|---|---|---|---|---|
| Invention | 94 | 1.5 | 21.0 | 400 | 80 | 2.0 | 1.5 | B | 1.6 |
| Comparative Example 1 | 94 | 1.4 | 20.5 | 405 | 20 | 0.6 | 1.5 | B | 1.4 |
| Comparative Example 2 | 94 | 1.6 | 21.2 | 400 | 50 | 1.0 | 1.2 | B | 1.8 |
| Comparative Example 3 | 92 | 1.0 | 19.5 | 395 | 85 | 3.2 | 5.7 | D | 5.5 |
| PET film | 92 | 1.1 | 23.0 | 410 | 15 | 0.3 | 0.9 | B | 1.1 |
| TAC film | 92 | 0.8 | 13.0 | 380 | 95 | 4.5 | 2.1 | C | 0.8 |

From the results of Table 12, it can be seen that the laminate film according to the present invention exhibits sufficient transparency while retaining excellent mechanical strength equal to PET film.

It can also be seen that the laminate film of the invention has sufficient water absorption properties thereby exhibiting satisfactory curling elimination properties comparable to TAC film, whereas the sample of Comparative Example 1 has substantially no water absorption properties because of lack of a water-absorbing polymer (polymer A) within 20 μm from the surface and therefor has no curling elimination properties. Further, the sample of Comparative Example 2 has low water absorption properties as having a water-

TABLE 13

| Support | Total Thickness (μm) | Tear Strength (kg/mm²) | Initial Modulus of Elasticity (kg/mm²) | Curling Recovery (%) | Thermal Deformation | Heat Shrinkage (150° C × 30 min) (%) |
| --- | --- | --- | --- | --- | --- | --- |
| Invention | 117 | 22.0 | 422 | 77 | B | 1.7 |
| Comparative Example 1 | 117 | 21.4 | 430 | 18 | B | 1.8 |
| Comparative Example 2 | 117 | 22.3 | 420 | 49 | B | 1.4 |
| Comparative Example 3 | 117 | 20.3 | 405 | 82 | D | 6.2 |
| PET film | 117 | 24.1 | 432 | 12 | B | 1.0 |
| TAC film | 117 | 13.2 | 402 | 92 | C | 2.3 |

As can be seen from the results of Table 13, the sample using the laminate support according to the present invention showed curling elimination properties after development processing equal to the sample using a TAC film support, whereas no substantial elimination of curling was observed with the sample using a PET film support. Where the water-absorbing polymer (polymer A) layer was present in the middle of the support as in Comparative Example 1, curling was not substantially eliminated. Where the water-absorbing polymer (polymer A) layer was on only one side of the support as in Comparative Example 2, the water absorption effect was reduced to half.

The sample using the laminate support of the present invention had improved heat shrinkage resistance comparable to the sample using a PET film support. To the contrary, the sample of Comparative Example 3 solely comprising polymer A suffered from extensive heat shrinkage.

Further, in using the laminate support of the present invention, the surface unevenness due to thermal deformation was comparable to the PET film, whereas the sample of Comparative Example 3 suffered from considerable thermal deformation.

Furthermore, the laminate film according to the present invention had high mechanical strength comparable to the PET film.

It has now been proved that a photographic material has curling elimination properties comparable to a TAC film while exhibiting high mechanical strength and heat resistance comparable to a PET film can be obtained by using a laminate film support composed of at least one layer comprising a polyester having a Tg of not lower than 63° C. and at least one layer comprising at least one of a polyester having a hydrophilic group and a water-absorbing polymer.

EXAMPLE 8

1) Preparation of Photographic Material:
A photographic material was prepared in the same manner as in Example 7, except that no magnetic recording layer was formed.

2) Sample Processing:
The resulting photographic material was slit to a width of 35 mm, perforated, and put in an ordinary cartridge of 135 format. The roll film in the cartridge was preserved at 50° C. for 5 days to give a curl.

3) Development Processing:
The photographic material was development processed in the same manner as in Example 1.

4) Evaluation of Photographic Material:
The photographic material was evaluated in terms of recovery from curling, heat shrinkage, thermal deformation, and mechanical strength in the same manner as in Example 7. The results obtained are shown in Table 14 below.

TABLE 14

| Support | Total Thickness (μm) | Tear Strength (kg/mm²) | Initial Modulus of Elasticity (kg/mm²) | Curling Recovery (%) | Thermal Deformation | Heat Shrinkage (150° C. × 30 min) (%) |
| --- | --- | --- | --- | --- | --- | --- |
| Invention | 116 | 22.1 | 421 | 78 | B | 1.7 |
| Comparative Example 1 | 116 | 21.5 | 432 | 19 | B | 1.9 |
| Comparative Example 2 | 116 | 22.2 | 418 | 51 | B | 1.5 |
| Comparative Example 3 | 116 | 20.2 | 406 | 82 | D | 6.3 |
| PET film | 116 | 24.3 | 430 | 12 | B | 1.1 |
| TAC film | 116 | 13.0 | 405 | 91 | C | 2.2 |

As can be seen from the results of Table 14, the sample using the laminate film support according to the present invention exhibited satisfactory performance properties in heat resistance, curling elimination, and mechanical strength when applied to a conventional cartridge system as well as a new cartridge system as in Example 7.

It has now been proved that a photographic material, which recovers from curling on development processing while exhibiting high mechanical strength and excellent heat resistance, can be obtained by using a laminate film support composed of at least one layer comprising a polyester having a Tg of 63° C. or higher and at least one layer comprising at least one of a polyester having a hydrophilic group and a water-absorbing polymer. The photographic material thus obtained overcomes the disadvantages associated with conventional photographic materials using a TAC film support, i.e., a high cost and poor mechanical properties in spite of curling elimination properties. Accordingly, the photographic material according to the present invention can be used in fields where no film other than a TAC film could be used due to lack of curling elimination properties, such as color negative films and color reversal films, thereby making it possible to reduce cost and increase strength.

The photographic material according to the present invention manifests its superiority particularly when applied to the aforesaid new cartridge systems. That is, as compared with conventional photographic materials using a TAC film support, the photographic material of the present invention exhibits greatly improved strength sufficient to be applied to the new cartridge system and, at the same time, can have reduced thickness thereby making it possible to reduce the size of a cartridge.

While the invention has been described in detail and with reference to specific examples thereof, it will be apparent to one skilled in the art that various changes and modifications can be made therein without departing from the spirit and scope thereof.

What is claimed is:

1. A silver halide photographic material comprising on a polyester film support at least one light-sensitive layer, wherein said polyester film support satisfies the following relationships:

$Tg \leq 32.1A^2 + 55$ $X \geq 31\ 0.74Tg + 71.7$ wherein Tg is glass transition temperature (°C.); A is equilibrium water content (%) after moisture conditioning at 25° C. and 50% RH for 10 days; and X is degree of crystallinity;

wherein said silver halide photographic material further comprises on at least one side of the support a magnetic recording layer containing a ferromagnetic powder in an amount of $4\times10^{-3}$ to 1 g per m$^2$ of the support and having a coercive force of not less than 400 Oe coated over the surface of said side or coated in stripes, and said silver halide photographic material is a roll film in a cartridge system wherein the end of the roll film wound around a spool is fed out of a cartridge body from a film outlet by turning the spool rotatably attached to the cartridge body in the film feed direction; and wherein a pair of ribs are provided on the inner side of the cartridge body.

2. A silver halide photographic material as in claim 1, wherein said polyester film support comprises a polyester having a hydrophilic group.

3. A silver halide photographic material as in claim 2, wherein said polyester having a hydrophilic group is obtained by reacting a dibasic acid and a glycol, wherein the hydrophilic group in said polyester having a hydrophilic group is present in either of the dibasic acid or the glycol, and the hydrophilic group is selected from the group consisting of a sulfo group, a sulfino group, a phosphono group, a carboxyl group, a salt of a sulfo group, a salt of a sulfino group, a salt of a phosphono group, a salt of a carboxyl group, a polyalkyleneoxy group, and a disulfonamido group.

4. A silver halide photographic material as in claim 1, wherein said cartridge system satisfies the equation $2mm \geq b/2 - a/2 - c \cdot d - t$ wherein a is the outer diameter of said spool, b is the inner diameter of said cartridge body, t is the thickness of a rib on the inner side of said cartridge body, c is the thickness of said film, and d is the number of turns of said film.

5. A silver halide photographic material comprising on a polyester film support at least one photographic layer, wherein said polyester film support satisfies the following relationships:

$Tg \leq 32.1A^2 + 55$ $X \geq -0.74Tg + 71.7$ $S \geq 13$ $T \leq 0.25$ $K \geq 80$ wherein Tg is glass transition temperature (°C.); A is equilibrium water content (%) after moisture conditioning at 25° C. and 50% RH for 10 days; X is degree of crystallinity; S is stiffness (g) with a thickness of 70 μm; T is average percent thermal resistance (%) in the transverse direction and the machine direction; and K is percent transmission (%) at a wavelength of 400 nm;

wherein said silver halide photographic material further comprises on at least one side of the support a magnetic recording layer containing a ferromagnetic powder in an amount of $4\times10^{-3}$ to 1 g per m$^2$ of the support and having a coercive force of not less than 400 Oe coated over the surface of said side or coated in stripes, and said silver halide photographic material is a roll film in a cartridge system wherein the end of the roll film wound around a spool is fed out of a cartridge body from a film outlet by turning the spool rotatably attached to the cartridge body in the film feed direction; and wherein a pair of ribs are provided on the inner side of the cartridge body.

6. A silver halide photographic material as in claim 5, wherein said polyester film support comprises a polyester having a hydrophilic group.

7. A silver halide photographic material as in claim 6, wherein said polyester having a hydrophilic group is obtained by reacting a dibasic acid and a glycol, wherein the hydrophilic group in said polyester having a hydrophilic group is present in either of the dibasic acid or the glycol, and the hydrophilic group is selected from the group consisting of a sulfo group, a sulfino group, a phosphono group, a carboxyl group, a salt of a sulfo group, a salt of a sulfino group, a salt of a phosphono group, a salt of a carboxyl group, a polyalkyleneoxy group, and a disulfonamido group.

8. A silver halide photographic material as in claim 5, wherein said cartridge system satisfies the equation $2mm \geq b/2 - a/2 - c \cdot d - t$ wherein a is the outer diameter of said spool, b is the inner diameter of said cartridge body, t is the thickness of a rib on the inner side of said cartridge body, c is the thickness of said film, and d is the number of turns of said film.

9. A silver halide photographic material comprising on a polyester film support at least one light-sensitive layer, wherein said polyester film support comprises a mixture of (i) polyethylene terephthalate and (ii) a polyester having a hydrophilic group; and wherein said silver halide photographic material further comprises on at least one side of the support a magnetic recording layer containing a ferromagnetic powder in an amount of $4\times10^{-3}$ to 1 g per m² of the support and having a coercive force of not less than 400 Oe coated over the surface of said side or coated in stripes, and said silver halide photographic material is a roll film in a cartridge system wherein the end of the roll film wound around a spool is fed out of a cartridge body from a film outlet by turning the spool rotatably attached to the cartridge body in the film feed direction.

10. A silver halide photographic material as in claim 9, wherein said polyester having a hydrophilic group is obtained by reacting a dibasic acid and a glycol, wherein the hydrophilic group in said polyester having a hydrophilic group is present in either of the dibasic acid or the glycol, and the hydrophilic group is selected from the group consisting of a sulfo group, a sulfino group, a phosphono group, a carboxyl group, a salt of a sulfo group, a salt of a sulfino group, a salt of a phosphono group, a salt of a carboxyl group, a polyalkyleneoxy group, and a disulfonamido group.

11. A silver halide photographic material comprising on a polyester film support at least one light-sensitive layer, wherein said polyester film support is a laminate film composed of at least one layer comprising a polyester having a Tg of not lower than 63° C. and at least one layer comprising a polyester having a hydrophilic group; and wherein said silver halide photographic material further comprises on at least one side of the support a magnetic recording layer containing a ferromagnetic powder in an amount of $4\times10^{-3}$ to 1 g per m² of the support and having a coercive force of not less than 400 Oe coated over the surface of said side or coated in stripes, and said silver halide photographic material is a roll film in a cartridge system wherein the end of the roll film wound around a spool is fed out of a cartridge body from a film outlet by turning the spool rotatably attached to the cartridge body in the film feed direction.

12. A silver halide photographic material as in claim 11, wherein said polyester having a hydrophilic group is obtained by reacting a dibasic acid and a glycol, wherein the hydrophilic group in said polyester having a hydrophilic group is present in either of the dibasic acid or the glycol, and the hydrophilic group is selected from the group consisting of a sulfo group, a sulfino group, a phosphono group, a carboxyl group, a salt of a sulfo group, a salt of a sulfino group, a salt of a phosphono group, a salt of a carboxyl group, a polyalkyleneoxy group, and a disulfonamido group.

13. A silver halide photographic material as in claim 11, wherein said at least one layer comprising a polyester having a hydrophilic is present within a depth of 20 μm from the surface of at least one side of said laminate film.

14. A silver halide photographic material as in claim 11, wherein said at least one layer comprising a polyester having a hydrophilic group is laminated on both sides of said layer comprising a polyester having a Tg of not lower than 63° C., and said at least one layer comprising a polyester having a hydrophilic group is present within a depth of 20 μm from the surface of at least one side of said laminate film.

15. A silver halide photographic material comprising on a polyester film support at least one light-sensitive layer, wherein said support comprises polyester which is obtained by reacting a dibasic acid and a glycol, wherein either the dibasic acid or the glycol has a hydrophilic group, said silver halide photographic material further comprising on at least one side of the support a magnetic recording layer containing a ferromagnetic powder in an amount of from $4\times10^{-3}$ to 1 g per m² of the support and having a coercive force of not less than 400 Oe either coated over the surface of said side or coated in stripes, and said silver halide photographic material is a roll film in a cartridge system wherein the end of the roll film wound around a spool is fed out of a cartridge body from a film outlet by turning the spool rotatably attached to the cartridge body in the film feed direction;

wherein a pair of ribs are provided on the inner side of the cartridge body.

16. A silver halide photographic material as in claim 15, wherein said polyester film support is a laminate film composed of at least one layer comprising the polyester having a hydrophilic group is laminated on both sides of a polyester layer having a Tg of not lower than 63° C., and said at least one layer comprising the polyester having a hydrophilic group is present within a depth of 20 μm from the surface of at least one side of said laminate film.

17. A silver halide photographic material as in claim 16, wherein (i) the dibasic acid comprises a benzene ring or a naphthalene ring, and a carboxyl group, a sulfo group, a sulfino group, a phosphonic acid group, a salt of any of these groups, or a hydroxyl group, and (ii) the glycol comprises polyoxyalkylene or polyoxyglycerin.

18. A silver halide photographic material as in claim 15, wherein (i) the dibasic acid comprises a benzene ring or a naphthalene ring, and a carboxyl group, a sulfo group, a sulfino group, a phosphonic acid group, a salt of any of these groups, or a hydroxyl group, and (ii) the glycol component comprises polyoxyalkylene or polyoxyglycerin.

19. A silver halide photographic material as in claim 15, wherein said cartridge system satisfied the equation $$2mm \geq b/2 - a/2 - c \cdot d - t$$

wherein a is the outer diameter of said spool, b is the inner diameter of said cartridge body, t is the thickness of a rib on the inner side of said cartridge body, c is the thickness of said film, and d is the number of turns of said film.

20. A silver halide photographic material comprising on a polyester film support at least one light-sensitive layer, wherein said support comprises polyester which comprises a mixture of (i) polyethylene terephthalate and (ii) a polyester having a hydrophilic group, said silver halide photographic material further comprising on at least one side of the support a magnetic recording layer containing a ferromagnetic powder in an amount of from $4\times10^{-3}$ to 1 g per m² of the support and having a coercive force of not less than 400 Oe coated over the surface of said side or coated in stripes.

* * * * *